United States Patent
Hayashi et al.

(10) Patent No.: US 8,305,656 B2
(45) Date of Patent: Nov. 6, 2012

(54) IMAGE READING APPARATUS, IMAGE FORMING APPARATUS INCORPORATING THE SAME, IMAGE READING CONTROL METHOD THEREFOR, AND PROGRAM IMPLEMENTING THE METHOD

(75) Inventors: Toshio Hayashi, Toride (JP); Koji Doi, Yokohama (JP); Yoshihiro Funamizu, Abiko (JP); Kunio Tsuruno, Tokyo (JP); Satoru Kanno, Kashiwa (JP); Akihito Mori, Toride (JP); Mitsushige Murata, Yokohama (JP)

(73) Assignee: Canon Kabushiki Kaisha (JP)

( * ) Notice: Subject to any disclaimer, the term of this patent is extended or adjusted under 35 U.S.C. 154(b) by 1342 days.

(21) Appl. No.: 11/438,485

(22) Filed: May 22, 2006

(65) Prior Publication Data

US 2006/0274384 A1 Dec. 7, 2006

(30) Foreign Application Priority Data

May 24, 2005 (JP) .................. 2005-150921

(51) Int. Cl.
*H04N 1/04* (2006.01)
*H04N 1/32* (2006.01)
(52) U.S. Cl. ........ 358/486; 358/468; 358/474; 358/475; 358/487; 358/497; 358/498
(58) Field of Classification Search .................. 358/1.9, 358/1.13–1.15, 3.21–3.23, 468, 474, 475, 358/486, 487, 497, 498
See application file for complete search history.

(56) References Cited

U.S. PATENT DOCUMENTS

| | | | | |
|---|---|---|---|---|
| 4,906,910 A * | 3/1990 | Tanuma et al. | ............... | 318/696 |
| 5,198,909 A * | 3/1993 | Ogiwara et al. | ............... | 358/412 |
| 5,499,341 A * | 3/1996 | Wilson et al. | .................... | 710/21 |
| 5,502,576 A * | 3/1996 | Ramsay et al. | ............... | 358/444 |
| 5,606,395 A * | 2/1997 | Yang et al. | ....................... | 399/81 |
| 5,701,505 A * | 12/1997 | Yamashita et al. | ............... | 712/11 |
| 5,907,669 A * | 5/1999 | Yoshiura et al. | ............. | 358/1.16 |
| 5,999,766 A * | 12/1999 | Hisatomi et al. | ................. | 399/80 |
| 6,236,996 B1 * | 5/2001 | Bapat et al. | ........................... | 1/1 |
| 6,247,078 B1 * | 6/2001 | Ebert et al. | .................... | 710/301 |
| 6,275,825 B1 * | 8/2001 | Kobayashi et al. | ................... | 1/1 |
| 6,278,513 B1 * | 8/2001 | Murata et al. | ................... | 355/44 |
| 6,292,594 B1 * | 9/2001 | Iwai | ............................. | 382/298 |
| 6,459,509 B1 * | 10/2002 | Maciey et al. | ................. | 358/474 |
| 6,570,671 B1 * | 5/2003 | Yamaguchi et al. | ......... | 358/1.16 |
| 6,771,397 B2 * | 8/2004 | Hashizume | .................... | 358/474 |
| 6,831,761 B2 * | 12/2004 | Cardot et al. | ................. | 358/505 |
| 6,848,061 B2 * | 1/2005 | Kawase | .......................... | 713/600 |
| 7,006,260 B2 * | 2/2006 | Sato et al. | ....................... | 358/448 |
| 7,095,968 B2 * | 8/2006 | Akita et al. | ..................... | 399/45 |
| 7,142,334 B1 * | 11/2006 | Zechleitner | ................... | 358/474 |

(Continued)

FOREIGN PATENT DOCUMENTS

JP 05-104808 A 4/1993

(Continued)

*Primary Examiner* — Twyler Haskins
*Assistant Examiner* — Jonathan Beckley
(74) *Attorney, Agent, or Firm* — Rossi, Kimms & McDowell LLP

(57) ABSTRACT

An image reading apparatus which improved the development efficiency and is capable of reducing the development cost. The image reading apparatus comprises a specific unit 1001 and an alignment unit 1002. The specific unit 1001 has an CPU 1501 that informs the alignment unit 1002 of identification information for identifying an apparatus specification of the specific unit 1001.

10 Claims, 22 Drawing Sheets

U.S. PATENT DOCUMENTS

| | | | |
|---|---|---|---|
| 7,233,410 B2* | 6/2007 | Sekiguchi et al. | 358/1.16 |
| 7,256,380 B2* | 8/2007 | Kamisuwa et al. | 250/208.1 |
| 7,298,982 B2* | 11/2007 | Akita et al. | 399/45 |
| 7,313,699 B2* | 12/2007 | Koga | 713/170 |
| 7,519,597 B2* | 4/2009 | Kano | 1/1 |
| 7,571,487 B2* | 8/2009 | Shibata | 726/26 |
| 7,609,412 B2* | 10/2009 | Maruyama | 358/1.9 |
| 7,657,753 B2* | 2/2010 | Sawada | 713/183 |
| 7,668,830 B2* | 2/2010 | Hakala | 1/1 |
| 2004/0125402 A1* | 7/2004 | Kanai et al. | 358/1.15 |
| 2004/0156056 A1* | 8/2004 | Sawada | 358/1.2 |
| 2004/0212855 A1* | 10/2004 | Okamoto | 358/498 |
| 2004/0233479 A1* | 11/2004 | Hashizume | 358/461 |
| 2004/0263903 A1* | 12/2004 | Oikawa | 358/1.15 |
| 2005/0021980 A1* | 1/2005 | Kanai | 713/182 |
| 2005/0157319 A1* | 7/2005 | Mizuhashi et al. | 358/1.9 |
| 2005/0275868 A1* | 12/2005 | Higashiura et al. | 358/1.14 |
| 2006/0050330 A1* | 3/2006 | Tanimoto et al. | 358/474 |
| 2006/0256353 A1* | 11/2006 | Noda et al. | 358/1.1 |
| 2007/0174896 A1* | 7/2007 | Furuya et al. | 726/1 |

FOREIGN PATENT DOCUMENTS

| | | |
|---|---|---|
| JP | 8-251320 A | 9/1996 |
| JP | 2003-307786 A | 10/2003 |

* cited by examiner

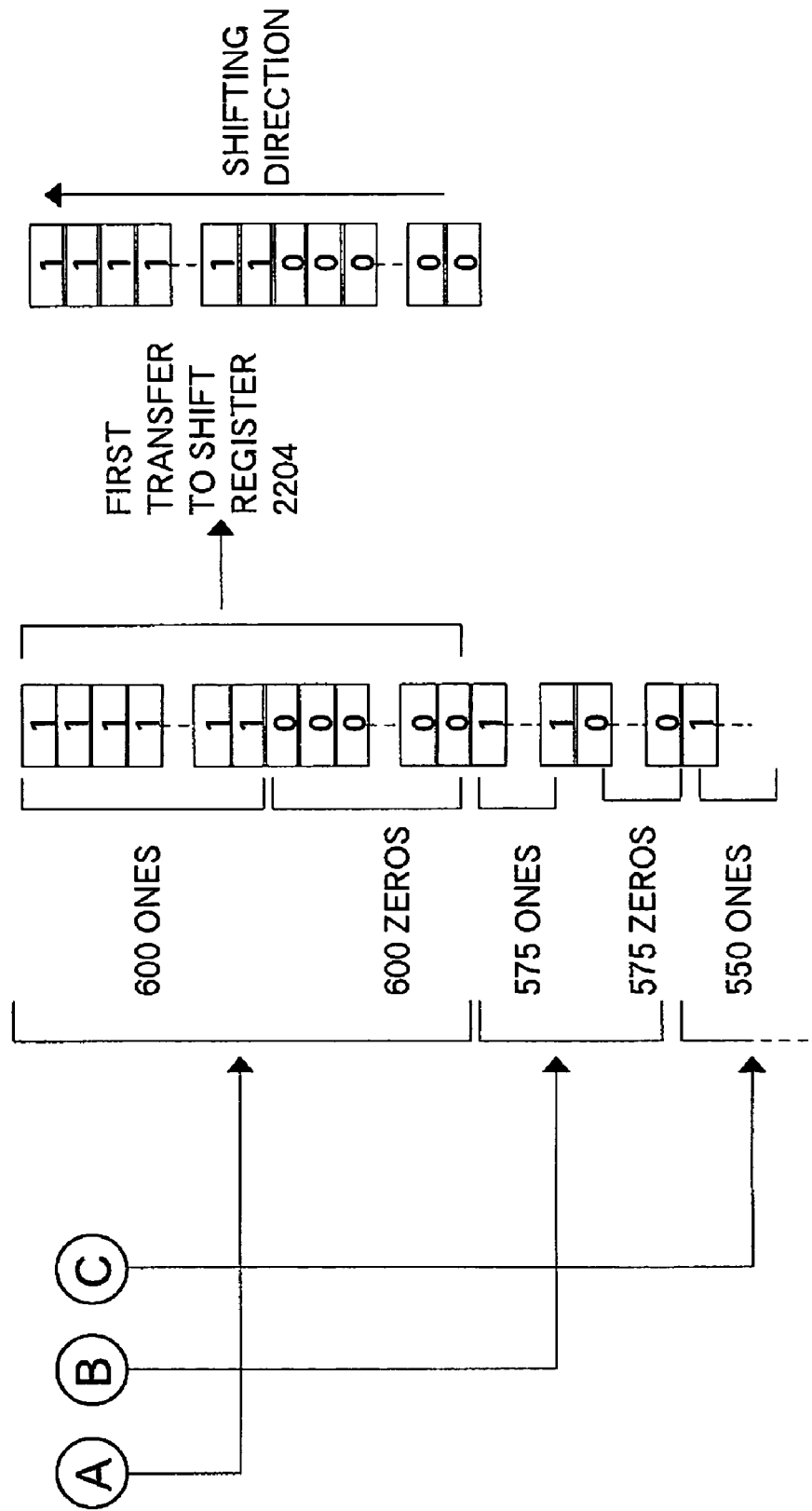

| ADDRESS | DATA |
|---|---|
| 0000h | 12000d |
| 0001h | 11500d |
| 0002h | 11000d |
| 0003h | 10500d |
| 0004h | 10000d |
| 0146h | 90d |
| 0147h | 70d |
| 0148h | 55d |
| 0149h | 43d |
| 0150h | 30d |
| 0151h | 30d |

READING DIRECTION

IMAGE READING APPARATUS, IMAGE FORMING APPARATUS INCORPORATING THE SAME, IMAGE READING CONTROL METHOD THEREFOR, AND PROGRAM IMPLEMENTING THE METHOD

BACKGROUND OF THE INVENTION

1. Field of the Invention

The present invention relates to an image reading apparatus for reading an image on a document, an image forming apparatus incorporating the image reading apparatus, an image reading control method therefor, and a program implementing the method.

2. Description of the Related Art

A copying machine includes an image reading apparatus and a printer apparatus. Compared to the printer apparatus, the image reading apparatus has a relatively simple structure that does not require intricate control. Therefore, its configuration can be implemented on a single control substrate.

Examples of the image reading apparatus includes one that reads a fixedly placed document, one that reads a conveyed document at a fixed reading position, and one that allows reading documents in a mode selected from the fixed-document reading and the conveyed-document reading. The fixed-document reading involves placing a document on a platen glass and fixing the document with a pressing plate, then moving a reader that includes a line image sensor, such as a CCD, across the document to read an image on the document. The conveyed-document reading uses an automatic document feeder (ADF). Specifically, the ADF conveys documents one by one through a reading position on a platen glass. When each document passes through the reading position, a reader fixed at the reading position reads an image on the document.

Besides image reading apparatus that have the ADF as standard equipment, there are image reading apparatuses that have the pressing plate as standard equipment and may optionally have the ADF.

For image reading apparatus that employ the fixed-document reading, the control specifications for controlling the mechanical operations other than image processing do not vary widely among apparatus models, although the driving speed of the reader (the image reading speed) may be higher or lower depending on each model.

On the other hand, for image reading apparatus that employ the conveyed-document reading, the ADF has a mechanical structure for implementing intricate paper conveyance. Therefore, in order to enable high-speed document conveyance, the ADF mounted on a high-speed apparatus for high-speed image reading has many stepping motors that function as driving forces for document conveyance, compared to a low-speed apparatus for low-speed image reading. In addition, since the high-speed apparatus requires higher accuracy in controlling the timing of document conveyance than the low-speed apparatus, more devices such as document position detecting sensors are provided therein.

Thus, since the ADF mounted on the low-speed apparatus has fewer stepping motors and devices such as sensors, a control section controlling the main unit of the low-speed apparatus can control the driving of the stepping motors in the ADF while monitoring output of the devices such as sensors in the ADF. That is, the control section controlling the main unit of the low-speed apparatus can directly control the ADF.

On the other hand, controlling the ADF mounted on the high-speed apparatus imposes a heavy control load. This makes it difficult for a control section to control the main unit of the high-speed apparatus for directly controlling the ADF. Therefore, the ADF mounted on the high-speed apparatus includes a control section for controlling the ADF. The control section of the ADF and the control section of the high-speed apparatus communicate with each other to perform control, such as coordinating respective operation timing.

Now, an image reading apparatus that has the above pressing plate as standard equipment and may optionally have an ADF will be described with reference to FIGS. 18 and 19. FIG. 18 is a longitudinal sectional view schematically showing the configuration of a conventional image reading apparatus with a pressing plate mounted thereon.

In FIG. 18, the image reading apparatus 1R' employs the fixed-document reading in which a pressing plate 1213 is mounted on the top of the apparatus. The image reading apparatus 1R' has a document-illuminating lamp 1201 for illuminating a document 1204 placed on a platen glass 1203, and mirrors 1205, 1206, and 1207 for guiding a reflected light from the illuminated document 1204 to a lens 1208. The light that has passed through the lens 1208 forms an image on a color CCD 1209, which converts the formed optical image into an electric signal and outputs it.

The document-illuminating lamp 1201 and the mirror 1205 are included in a reader 1210, which is designed to shuttle in the directions A and B indicated by arrows in FIG. 18. When the reader 1210 is moved in the direction A or B, the mirrors 1206 and 1207 are moved in unison in the direction A or B so that the distance from the document plane to the color CCD 1209 (the optical path length) is kept constant.

Provided at the front of the platen glass 1203 are a shading correcting board 1211, as well as a conveyed-document reading position window 1212 for reading a document image in the case where the image reading apparatus 1R' employs the conveyed-document reading, as will be described in FIG. 19. A pressing plate 1213 for pressing the document placed on the platen glass 1203 is provided over the platen glass 1203.

When a document is going to be read on the image reading apparatus 1R', an operator first opens the pressing plate 1213 and places the document on the platen glass 1203. The operator then closes the pressing plate 1213 and presses a start key to indicate the start of copying. This causes the image reading apparatus 1R' to start its reading operation. In this reading operation, the reader 1210 is first moved in the direction B from the position shown in FIG. 18 (referred to as a "home position" hereafter) and stopped at a position for reading the shading correcting board 1211.

Next, the document-illuminating lamp 1201 is lit to illuminate the shading correcting board 1211. The reflected light from the shading correcting board 1211 is guided via the mirrors 1205, 1206, and 1207 and the lens 1208 to the color CCD 1209, which reads the shading correcting board 1211. Based on output of the color CCD 1209 resulting from this reading, a shading correction is performed. This shading correction corrects variations in the illumination of the document-illuminating lamp 1201, a light fall-off at the edges of the lens 1208, and pixel-by-pixel variations in the sensitivity of the color CCD 1209. Thus, unevenness in reading the document image is corrected.

On completion of the shading correction, the reader 1210 is further moved in the direction B and stopped at the position directly under the conveyed-document reading window 1212 (referred to as a "reading start position" hereafter). The reader 1210 is moved from this position in the direction A with gradually increasing speed. On reaching a position corresponding to the leading end of the document 1204 on the platen glass 1203, the reader 1210 is moved from that position at a predetermined constant speed. While the reader 1210 is being moved at the constant speed, the color CCD 1209 captures the reflected light from the document 1204 to read the image on the document 1204.

When the reader 1210 reaches a position corresponding to the trailing end of the document 1204, the reader 1210 is stopped at that position and then moved in the direction B to the home position. The reader 1210 waits at the home position for reading the next document.

Now, the image reading apparatus 1R' of FIG. 18 having an ADF instead of the pressing plate 1213 will be described with reference to FIG. 19. FIG. 19 is a longitudinal sectional view schematically showing the configuration of the image reading apparatus 1R' of FIG. 18 with an ADF mounted thereon.

In FIG. 19, the image reading apparatus 1R' employs the conveyed-document reading in which an ADF 1300 is mounted in place of the pressing plate 1213. The ADF 1300 has a document holding tray 1301 that holds documents thereon. The documents on the document holding tray 1301 are fed one by one via paper feed rollers 1302 and 1303. Each document fed via the paper feed rollers 1302 and 1303 is conveyed by a conveying roller 1305 through a conveyed-document reading position (the position directly over the conveyed-document reading window 1212) with a guide of guides 1304, 1307, and 1306. The document is discharged on a discharge tray 1308.

When a plurality of documents are going to be read on this image reading apparatus 1R', the documents are put on the document holding tray 1301 of the ADF 1300 and the start key is pressed. Once the reading operation is started, the shading correcting board 1211 is first read as described above to perform the shading correction. After the shading correction, the reader 1210 is moved to the above-mentioned reading start position and stopped.

The ADF 1300 then starts feeding the documents. The fed documents pass through the conveyed-document reading position and are discharged on the discharge tray 1308. When each documents passes through the conveyed-document reading position, the reflected light from the document is guided via the mirrors 1205, 1206, and 1207 and the lens 1208 to the color CCD 1209, which reads the image on the document.

Now, the configuration of the image reading apparatus 1R' of FIG. 19 as a low-speed apparatus will be described with reference to FIG. 20. FIG. 20 is a block diagram showing an example of the configuration of the image reading apparatus 1R' of FIG. 19.

In FIG. 20, the image reading apparatus 1R' has a control substrate 1517. The control substrate 1517 includes a CPU 1501, a ROM 1502, a RAM 1503, and an image processing ASIC 1505, which are connected with each other via a system bus 1504. The CPU 1501 reads a program stored in the ROM 1502 and controls the system according to the read program by using the RAM 1503 as a working area. As required, the CPU 1501 also sets data for a register provided in the image processing ASIC 1505, and reads and writes the content of memory provided in the image processing ASIC 1505.

A CCD substrate 1514 with a color CCD 1209 for reading a document image is connected to the image processing ASIC 1505. Image data from the CCD substrate (color CCD 1209) 1514 is input to the image processing ASIC 1505, which then performs predetermined image processing on the input image data. The image data subjected to the image processing is sent to the printer apparatus (not shown) via an I/F circuit 1516.

A motor driver (M-DRV) 1506 on the control substrate 1517 is connected to the CPU 1501. The CPU 1501 sends to the motor driver 1506 frequency clocks corresponding to a rotation speed required for an optical motor 1507. The motor driver 1506 generates driving pulses according to the frequency clocks from the CPU 1501 and outputs the driving pulses to the optical motor 1507 for driving the reader 1210 shown in FIG. 19. According to the driving pulses, the optical motor 1507 is rotationally driven to move the reader 1210 to a desired position and to stop the reader 1210.

An inverter (INV) 1508 is also connected to the CPU 1501. The inverter 1508 lights the document-illuminating lamp 1201 when an ON signal is input from the CPU 1501. The lighting of the document-illuminating lamp 1201 is synchronized with the image reading by the image reading apparatus 1R', i.e., the activation of the optical motor 1507.

A home position sensor 1510 is also connected to the CPU 1501. The CPU 1501 detects whether or not the reader 1210 is at the home position based on a signal from the home position sensor 1510.

Document size detection sensors 1511a, 1511b are also connected to the CPU 1501. When the fixed-document reading is employed, the CPU 1501 detects the size of a document placed on the platen glass 1203 based on signals from the document size detection sensors 1511a, 1511b.

The ADF 1300 is also connected to the CPU 1501 via an I/F circuit 1512. The ADF 1300 includes a paper feed motor 1518 that drives the paper feed rollers 1302 and 1303 for feeding a document, and a leading motor 1519 that drives the conveying roller 1305 for conveying the document to the conveyed-document reading position. The paper feed motor 1518 and the leading motor 1519 are driven by corresponding motor drivers (not shown) respectively. These motor drivers are included in the ADF 1300. Furthermore, to correct the skew of the conveyed document, the ADF 1300 includes a registration sensor 1520 for detecting that the leading end of the document is at a registration position, a leading sensor 1521 for detecting that the conveyed document is at the conveyed-document reading position, and a discharge sensor 1522 for detecting that the conveyed document is at a discharge position. Output of these sensors 1520, 1521, and 1522 are input to the CPU 1501, which then provides the driving timing for conveying the document and detects jamming in the ADF 1300 based on the received output of the sensors 1520, 1521 and 1522.

Thus, the CPU 1501 controls the optical motor 1507 in the image reading apparatus 1R', and also controls the two motors 1518 and 1519 in the ADF 1300 while monitoring the output of the sensors 1520, 1521, 1522.

The driving of the optical motor 1507 in the image reading apparatus 1R' having the above configuration will be described with reference to FIG. 21. FIG. 21 is a timing chart showing a driving profile for the optical motor 1507 in the image reading apparatus 1R' of FIG. 20.

Here, the driving profile for the optical motor 1507 will be described for the case where the maximum reduction ratio required in the image reading apparatus 1R' is 50% and the document is read without using the ADF 1300, i.e., in the fixed-document reading mode. In FIG. 21, the horizontal axis indicates time and the vertical axis indicates the driving speed of the reader 1210.

As shown in FIG. 21, the optical motor 1507 is activated at the time t0, and the reader 1210 at the reading start position (the position directly under the conveyed-document reading window 1212 in FIG. 18) starts moving at the speed of 7 mm/s. The optical motor 1507 is driven so that the reader 1210 is accelerated at the acceleration $\alpha$ until the time t1, at which point the speed reaches 200 mm/s, i.e., the reading speed for the reduction ratio of 50%. At this point, the reader 1210 has reached the position directly under the leading end of the document 1204. Then, the reading of the document 1204 is started from this position, and the optical motor 1507 is driven so that the reader 1210 is moved at the reading speed of 200 mm/s. Thus, the reader 1210 is moved at the constant speed during the reading of the document 1204.

On completion of the reading of the document 1204 at the time t2, i.e., when the reader 1210 is at the position directly under the trailing end of the document 1204, the optical motor 1507 is driven so that the reader 1210 is decelerated at the deceleration β until the time t3, at which point the speed reaches 7 mm/s. The optical motor 1507 is stopped at the time t3.

The optical motor 1507 is kept at a stop until the time t4, at which point it is driven to move the reader 1210 in the direction opposite to the reading direction at the speed of 7 mm/s. The optical motor 1507 is then driven so that the reader 1210 is accelerated at the acceleration α until the time t5, at which point the speed reaches 200 mm/s. The reader 1210 is moved at the speed of 200 mm/s during the period from the time t5 to the time t6, at which point the reader 1210 begins to be decelerated at the deceleration β. When the speed of the reader 1210 reaches 7 mm/s at the time t7, the optical motor 1507 is stopped. At this point, the reader 1210 is at the reading start position. In order for the reader 1210 to stop at the reading start position at the time t7, the number of motor clocks sent during the period from the time t0 to the time t3 and the period from the time t4 to the time t7 are set to be equal.

Next, the reader 1210 is then returned to the home position according to a home position return sequence.

FIGS. 22A, 22B are diagrams useful in explaining the generation of the motor clocks for the motor driver 1506 by the CPU 1501 in FIG. 20. FIG. 22A is a block diagram showing the configuration of the CPU 1501 and its periphery. FIG. 22B is a diagram showing a speed table for the acceleration interval from the time t0 to the time t1 in FIG. 21.

As shown in FIG. 22A, the CPU 1501 reads driving data stored in the ROM 1502 (S1) and deploys the speed table shown in FIG. 22B on the RAM 1503 as data indicating clock cycles per clock (S2). The CPU 1501 sequentially reads the cycle for each clock from the speed table deployed on the RAM 1503 (S3) and generates the motor clocks.

The above-mentioned driving data includes parameters, for example, for cycle data corresponding to the speed at the start of acceleration and the end of deceleration at the times t0, t3, t4, and t7, and data corresponding to the reading speed and the back scan speed at the times t1, t5 in FIG. 21. Since the acceleration interval, i.e., the distance that the reader 1210 moves during the period from the time t0 to the time t1 in FIG. 21 is determined from the structure of the image reading apparatus 1R', the number of motor clocks sent during the period from the time t0 to the time t1 is uniquely determined based on the moving distance. Assuming that the acceleration interval is 30 mm and the moving distance per clock is 0.2 mm, the number of clocks is 150 regardless of the frequency.

The speed table stored in the RAM 1503 is structured as shown in FIG. 22B. It is noted that FIG. 22B shows only data on the speed table from the time t0 to the time t1. For example, on activation of the optical motor 1507, the CPU 1501 first reads data (12000d) for the address 0000h. The CPU 1501 counts the system clocks that are input from an oscillator 1701, and when the count value reaches 12000, the CPU 1501 outputs a motor clock from a port P of the CPU 1501. The output motor clock is input to the motor driver 1506 and also to an interruption terminal INT of the CPU 1501. On receiving the input interruption, the CPU 1501 reads data (11500d) for the address 0001h on the speed table, and when the count value reaches 11500, the CPU 1501 generates a motor clock.

In this manner, the CPU 1501 sequentially reads data on the speed table and generates a corresponding motor clock. The motor driver 1506 drives the optical motor 1507 based on the motor clocks so that the reader 1210 is moved with gradually increasing speed.

When the CPU 1501 reads data (30d) for the address 0150h and the count value reaches 30, the reader 1210 has moved the distance of 30 mm. From this position, the reader 1210 moves at the constant speed of 200 mm/s as shown in FIG. 21, and the reading of the document is started. The count value 30 here indicates the processing for moving the reader 1210 at the speed of 200 mm/s.

For example, if the constant speed interval corresponds to the size A3 (the moving distance of the reader 1210 is 420 mm) and the deceleration interval is 20 mm, the total moving distance of the reader 1210 is 470 mm. This requires a speed table that consists of 2100 data items.

The control over the reader 1210 during deceleration will not be described because it is performed in a manner similar to the control during acceleration.

Now, the control of the CPU 1501 over the ADF 1300 will be described for the case where the image reading apparatus 1R' has the ADF 1300 (FIG. 20).

The ADF 1300 is driven and controlled by the CPU 1501. While the ADF 1300 includes the paper feed motor 1518 and the leading motor 1519, there are no significant differences between the control of the CPU 1501 over these motors 1518 and 1519 and that over the optical motor 1517. Therefore, since the position of the reader 1210 is fixed when the ADF 1300 is used to perform the conveyed-document reading, the load of controlling the optical motor 1507 is very light, and the main control load on the CPU 1501 is the load of controlling the motors 1518 and 1519 in the ADF 1300. That is, the control load imposed on the CPU 1501 in the conveyed-document reading corresponds to the two motors.

This kind of control technique has been commonly known, and there is a printer apparatus to which this control technique is applied (see Japanese Patent Laid-Open No. H05-104808). The configuration of this printer apparatus will be described with reference to FIG. 23. FIG. 23 is a block diagram showing the configuration of a conventional printer apparatus. Here, an ink-jet printer apparatus will be described.

In FIG. 23, the printer apparatus 2300 is an ink-jet printer and includes a CPU 1, a RAM 2, a ROM 3, and a motor control section 10. Based on motor control data from the CPU 1, the motor control section 10 generates pulse width data for a carriage motor (X motor) for moving a carriage, pulse width data for a head motor (RH motor) for pressing down a print head, and pulse width data for a feed motor (Y motor) for feeding a paper to the print head. These pulse width data is output to a motor driver 6. The motor driver 6 drives the carriage motor (X motor), the head motor (RH motor), and the feed motor (Y motor) based on the respective pulse width data.

When a timer causes an interruption, the CPU 1 generates the motor control data based on data stored on the RAM 2. The generated motor control data is provided to the motor control section 10. Thus, there are no significant differences between the configuration for the motors of the ink-jet printer apparatus 2300 and the configuration for the motors of the image reading apparatus 1R'.

Now, the configuration of the image reading apparatus 1R' of FIG. 19 as a high-speed apparatus will be described with reference to FIG. 24. FIG. 24 is a block diagram showing another example of the configuration of the image reading apparatus 1R' of FIG. 19. FIG. 25 is a timing chart showing a driving profile for the reader 1210 in the image reading apparatus 1R' of FIG. 24.

In FIG. 24, functional blocks or members corresponding to those shown in FIG. 20 are designated by identical numerals.

In FIG. 24, in order to read the image at a high speed, the image reading apparatus 1R' differs from the exemplary image reading apparatus 1R' shown in FIG. 21, in that a different speed table is used for controlling the optical motor 1507, the ADF 1300 further has components such as a CPU 1803, and a slave CPU 1801 is inserted between the CPU 1501 and the interface circuit 1512 to the ADF 1300.

The speed table for the optical motor 1507 is plotted as shown in FIG. 25. Since the image reading apparatus 1R' is a high-speed apparatus, the acceleration α2 of the reader 1210 from the time t0 to the time t1 is higher than the acceleration α of the reader 1210 for the low-speed image reading apparatus 1R' (shown in FIG. 21). Similarly, the deceleration β2 is higher than the deceleration β (shown in FIG. 21). The reader 1210 is therefore driven at the speed of 400 mm/s, which is twice the speed of 200 mm/s of the reader 1210 for the image reading apparatus 1R' in FIG. 21.

However, since both of the image reading apparatus shown in FIGS. 21, 24 use the same optical frame (a frame that holds the platen glass and so forth), they have the same acceleration interval of 30 mm and deceleration interval of 20 mm.

In addition to the paper feed motor 1518 and the leading motor 1519, the ADF 1300 mounted on the image reading apparatus 1R' of FIG. 24 includes additional motors for conveying documents at a high speed. These are a separating motor 1804 for separating a plurality of documents apart, and a spacing motor 1805 for suppressing a deviation of a document by nipping the conveyed document as needed. These four motors 1518, 1519, 1804, and 1805 provide conveyance of documents. A separation sensor 1806 that detects a separated document is also added for the necessity of closely monitoring the behavior of documents being conveyed.

In this type of ADF 1300, control over the motors 1518, 1519, 1804, 1805 is performed by the CPU 1803. This eliminates the necessity for the CPU 1501 on the image reading apparatus 1R' to directly control the ADF 1300. To keep track of the control performed by the slave CPU 1801 and the CPU 1501, a slave CPU 1802 is provided. The slave CPU 1802 transfers to the CPU 1803 control commands received from the CPU 1501 via the slave CPU 1801. According to the received control commands, the CPU 1803 controls the driving of the motors 1518, 1519, 1804, 1805 while monitoring output of the sensors 1521, 1522, 1523, 1806. The control status of the CPU 1803 is also transmitted to the CPU 1501 via the slave CPUs 1802, 1801.

Thus, for the ADF 1300, the CPU 1501 on the image reading apparatus 1R' of FIG. 24 only needs to communicate with the slave CPU 1801 but need not to send the motor clocks as in the case of the image reading apparatus 1R' of FIG. 21. Therefore, an increased control load is not imposed by the ADF 1300.

However, in the conventional image reading apparatus 1R', the control means consists in the single control substrate 1517 as described above. This requires designing a new control substrate 1517 for each development of a product, thereby increasing the effort for designing the control substrate 1517. With regard to control software, the control software is often shared among different apparatus models because great part of it is based on design specifications common to different apparatus models. Therefore, software components for only differences, such as the driving speed of the reader 1210 and the control of the image processing ASIC 1505, may be newly created. However, even such a software program with much common part is treated as a different program for each apparatus model, and is therefore developed and created for each apparatus model. This increases the effort for developing the software.

Moreover, since the control specifications of the ADF 1300 is different between the low-speed image reading apparatus 1R' and the high-speed image reading apparatus 1R', the control specifications must be designed individually. This results in an increased cost of developing a new apparatus model and an extra development period.

SUMMARY OF THE INVENTION

It is an object of the present invention to provide an image reading apparatus which improved the development efficiency and is capable of reducing the development cost, an image forming apparatus incorporating the image reading apparatus, an image reading control method therefor, and a program implementing the method.

To achieve the above object, in a first aspect of the present invention, there is provided an image reading apparatus having a reading unit for reading an image on a document, a driving unit for driving the reading unit, and a document feeding apparatus that feeds a document so that the document passes through a reading position where documents are read while being conveyed, comprising a first control unit that is provided with at least a function for controlling the document feeding apparatus, a second control unit that separates from the first control unit and controls the driving unit, and an interface unit that connects the first control unit and the second control unit in accordance with a predetermined interface specification, wherein the first control unit has an informing unit that informs, via the interface unit, the second control unit of identification information for identifying an apparatus specification of the image reading apparatus, the second control unit has a driving profile generation unit that generates a driving profile for the driving unit corresponding to the identification information informed by the first control unit, and the driving unit has its driving controlled according to the generated driving profile.

Preferably, the second control unit has a storage unit that stores data used for generating the driving profile for the driving unit in association with the identification information, and the driving profile generation unit obtains data associated with the informed identification information from the stored data and generates the driving profile for the driving unit based on the obtained data.

Preferably, the driving unit has a driving motor for driving the reading unit and a driving circuit, for driving the driving motor under the control of the second control unit, being included in the first control unit, and the second control unit outputs a control signal according to the generated driving profile to the driving circuit via the interface unit.

Preferably, the second control unit has a reinformation requesting unit that sends a reinformation request for asking the first control unit to reinform the identification information if the identification information informed by the first control unit cannot be recognized, and in the case where the reinformation request is received, the first control unit again reinforms the identification information recognizable by the second control unit in response to the reinformation request.

More preferably, the first control unit has a data rewriting unit that rewrites data stored in the storage unit via the interface unit.

More preferably, the storage unit is replaceably provided.

More preferably, the storage unit stores data for defining at least an acceleration in an acceleration interval, a deceleration in a deceleration interval and the speed in the constant-speed interval for the reading unit to read an image on the fixed document.

Preferably, an image forming apparatus comprises the image reading apparatus.

To achieve the above object, in a second aspect of the present invention, there is provided an image reading control method for an image reading apparatus having a reading unit for reading an image on a document and a driving unit for driving the reading unit, the image reading apparatus comprising a first control unit that is provided with a function for controlling an apparatus specification in the case where the apparatus specification is added to the image reading apparatus, and a second control unit that separates from the first control unit and controls the driving unit, wherein the image reading control method comprises an informing step of informing the second control unit of identification information for identifying the apparatus specification by the first control unit, and a driving profile generating step of generating a driving profile for the driving unit corresponding to the informed identification information by the second control unit, and the driving unit has its driving controlled according to the generated driving profile.

To achieve the above object, in a third aspect of the present invention, there is provided a program for causing a computer to execute an image reading control method for an image reading apparatus having a reading unit for reading an image on a document and a driving unit for driving the reading unit, the image reading apparatus comprising a first control unit that is provided with a function for controlling an apparatus specification in the case where the apparatus specification is added the image reading apparatus, and a second control unit that separates from the first control unit and controls the driving unit, wherein the program comprises an informing module for informing the second control unit of identification information for identifying the apparatus specification by the first control unit, and a driving profile generating module for generating a driving profile for the driving unit corresponding to the informed identification information by the second control unit, and the driving unit has its driving controlled according to the generated driving profile.

The above and other objects, features, and advantages of the invention will become more apparent from the following detailed description taken in conjunction with the accompanying drawings.

BRIEF DESCRIPTION OF THE DRAWINGS

FIGS. 5A to 5C are diagrams showing an operation timing chart for a RAM, a data deploying section, and a shift register in FIG. 4;

FIGS. 22A, 22B are diagrams useful in explaining generation of motor clocks for a motor driver by a CPU in FIG. 20, wherein FIG. 22A is a block diagram showing the configuration of the CPU and its periphery, and FIG. 22B is a diagram showing a speed table for an acceleration interval from the time t0 to the time t1 in FIG. 21;

DETAILED DESCRIPTION OF THE PREFERRED EMBODIMENTS

The present invention will now be described in detail with reference to the drawings showing preferred embodiments thereof. It should be noted that the relative arrangement of the components, the numerical expressions and numerical values set forth in the embodiments do not limit the scope of the present invention unless it is specifically stated otherwise.

The embodiments of the present invention will be described below with reference to the drawings.

Figure 1:
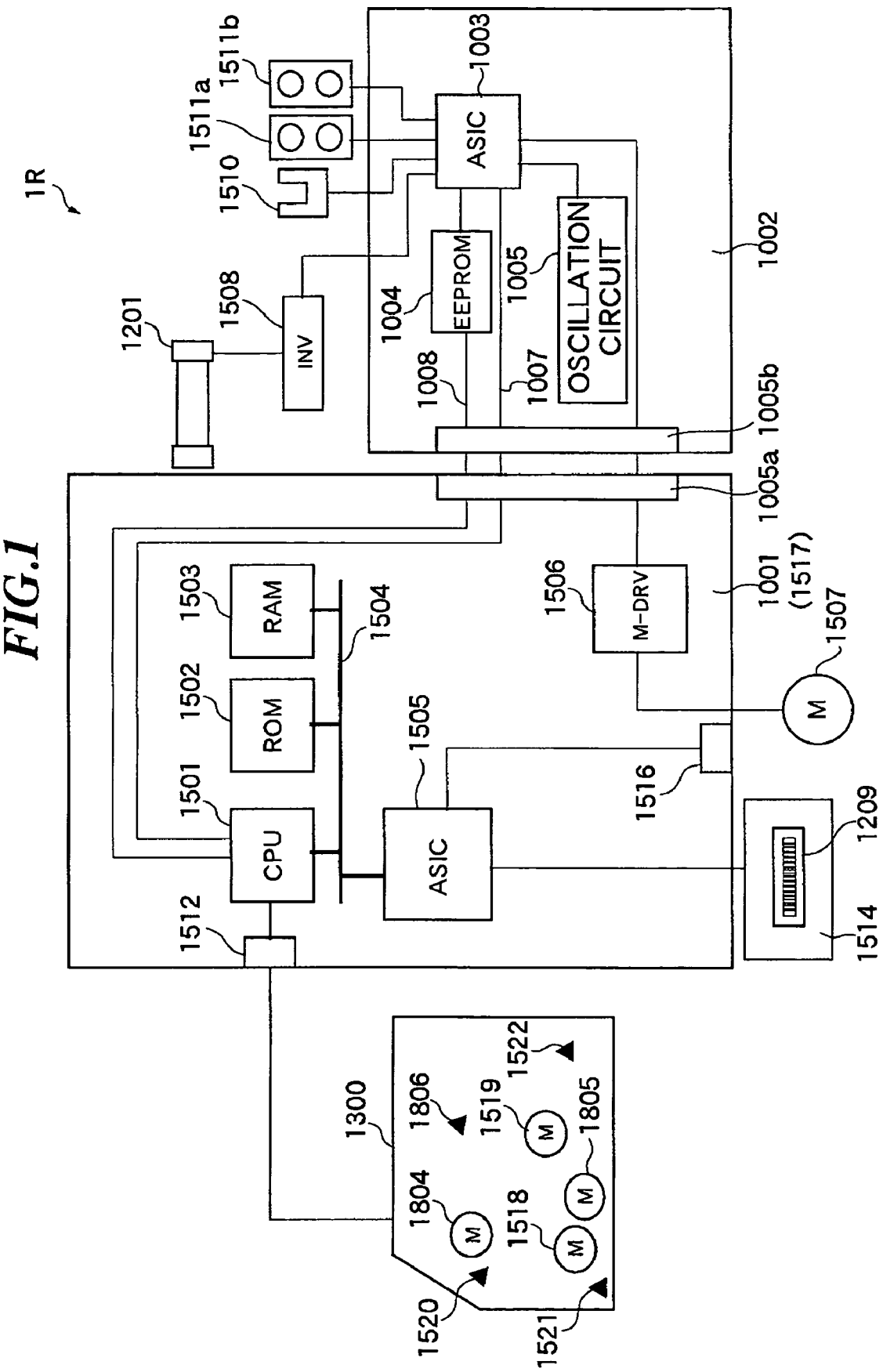
FIG. 1 is a block diagram showing the configuration of an image reading apparatus according to an embodiment of the present invention.
Figure 18:
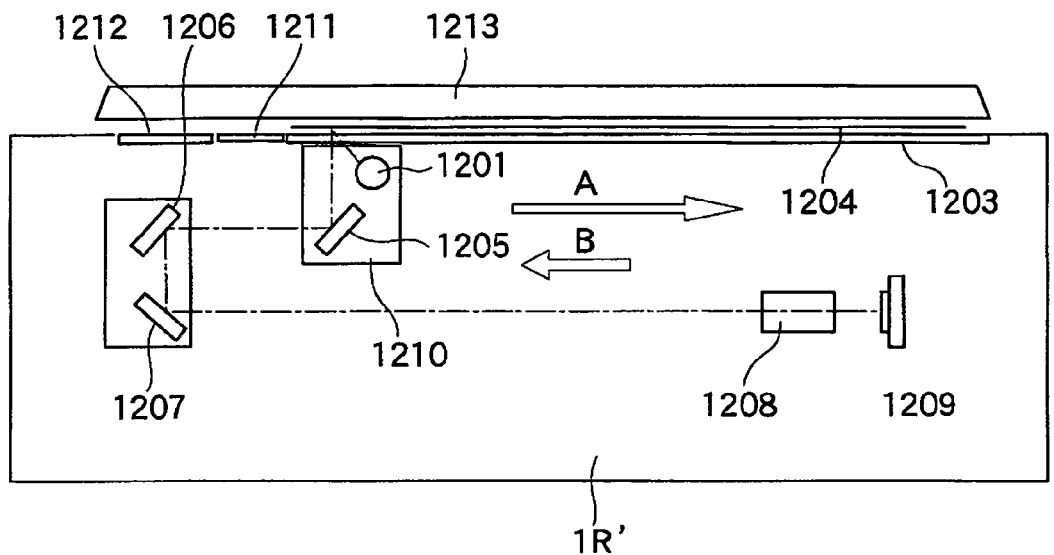
FIG. 18 is a longitudinal sectional view schematically showing the configuration of a conventional image reading apparatus with a pressing plate mounted thereon.
Figure 24:
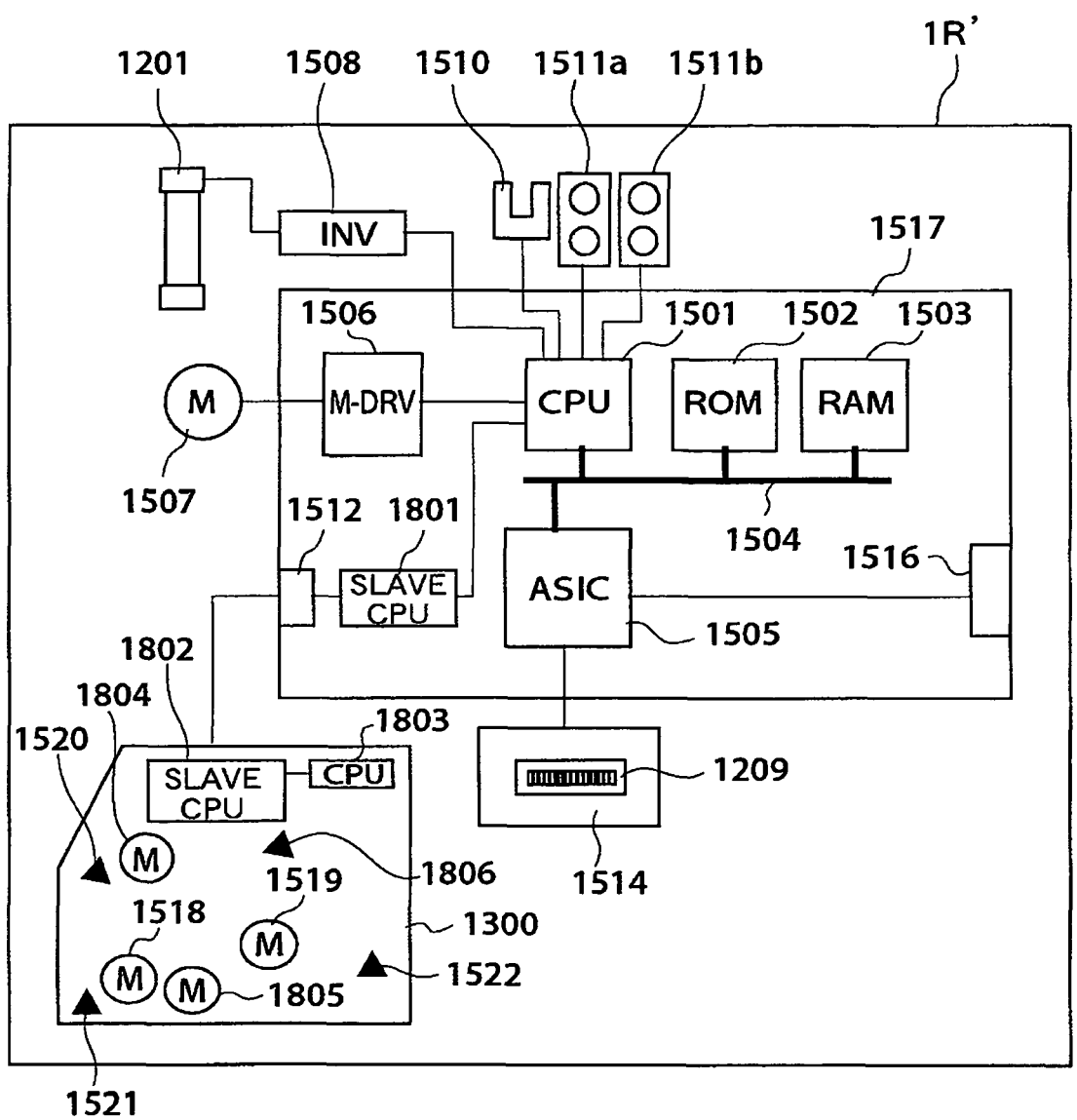
FIG. 24 is a block diagram showing another example of the configuration of the image reading apparatus.
Figure 25:
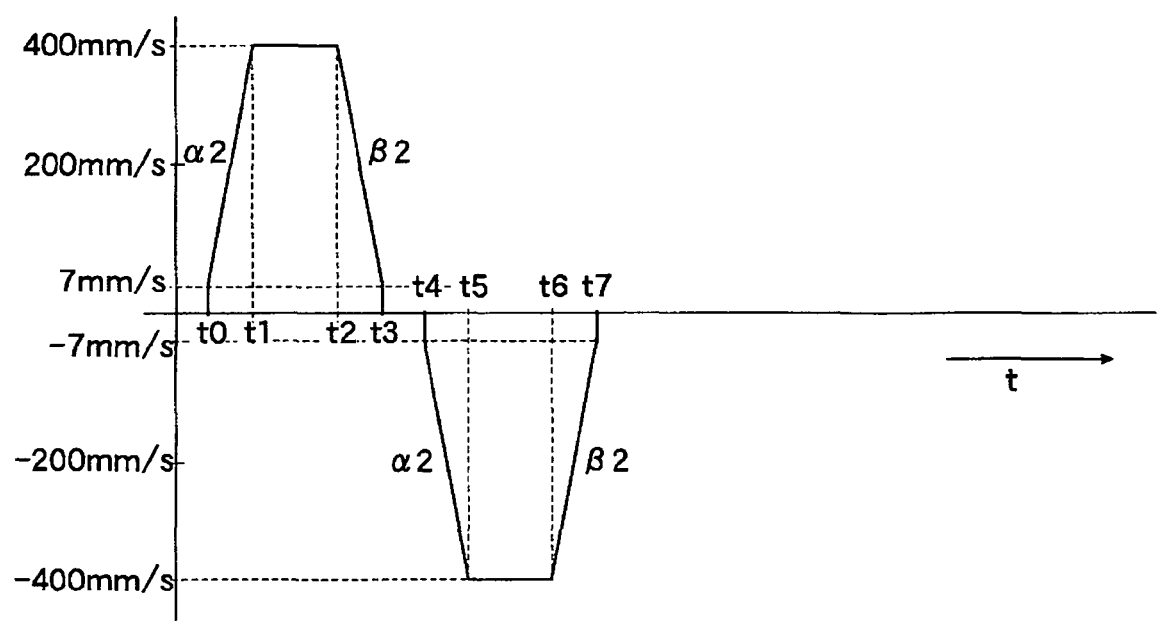
FIG. 25 is a timing chart showing a driving profile for the optical motor in the image reading apparatus of FIG. 24.

FIG. 1 is a block diagram showing the configuration of an image reading apparatus according to the embodiment of the present invention. The image reading apparatus 1R' in the present embodiment has the same configuration as the conventional image reading apparatus 1R' shown in FIGS. 18 and 19, but its configuration is different from the conventional configuration shown in FIGS. 20 and 24. Therefore, description will not be given here about the configuration of the image reading apparatus 1R but only about its configuration. In FIG. 1, functional blocks or members corresponding to those in FIG. 24 are designated by identical numerals.

In FIG. 1, the image reading apparatus 1R includes a control substrate 1517 (a first control unit) (referred to as a "specific unit 1001" hereafter), and an alignment unit (a second control unit) 1002 comprising a single control substrate. The specific unit 1001 is designed for the specifications of the image reading apparatus 1R, whereas the alignment unit 1002 is commonly usable irrespective of the specifications of the image reading apparatus 1R.

The specific unit 1001 is provided with a CPU 1501, a ROM 1502, a RAM 1503, an image processing ASIC 1505, a motor drive (M-DRV) 1506, an I/F circuit 1005a, and an I/F circuit 1512. The CPU 1501, the ROM 1502, the RAM 1503, and the image processing ASIC 1505 are connected with each other via a system bus 1504. The CPU 1501 controls the entire image reading apparatus 1R and also controls an ADF 1300 via the I/F circuit 1512.

A CCD substrate 1514 with a color CCD 1209 for reading a document image is connected to the image processing ASIC 1505. The image processing ASIC 1505 performs predetermined image processing on image data that is input from the CCD substrate (the color CCD 1209) 1514. It then outputs the image data subjected to the image processing to the outside (for example, to a controller 800 described below) via an I/F circuit 1516.

Figure 19:
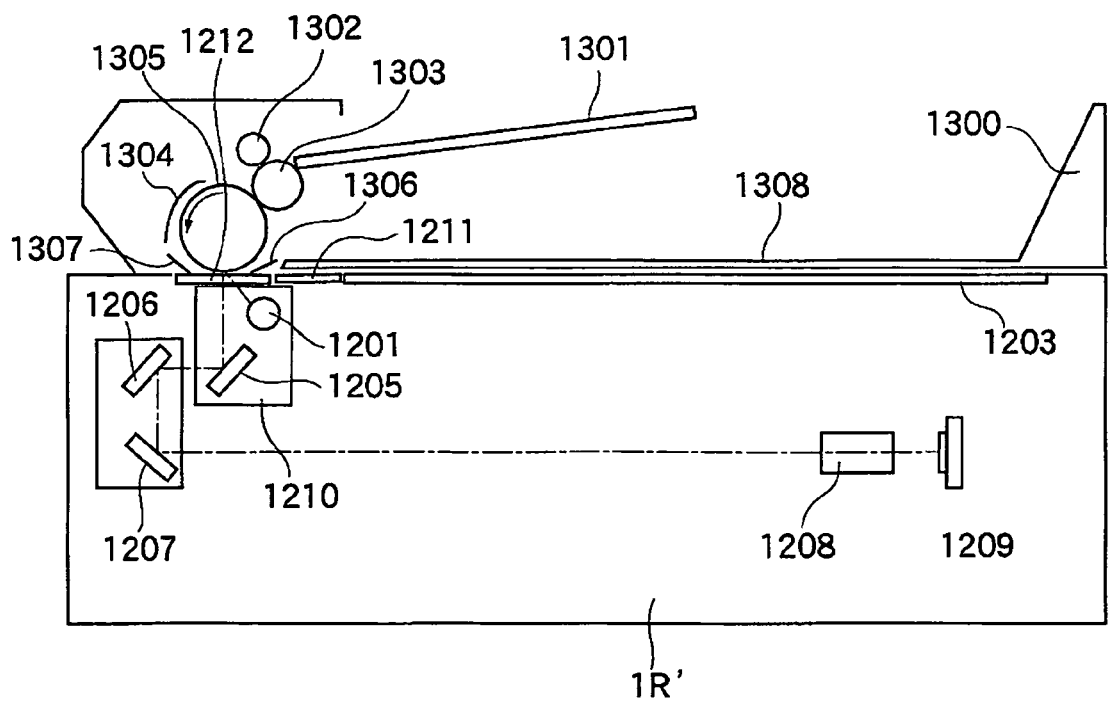
FIG. 19 is a longitudinal sectional view schematically showing the configuration of the image reading apparatus of FIG. 18 with an ADF mounted thereon.

The motor driver (M-DRV) 1506, based on a control signal that is input from the alignment unit 1002 via the I/F circuit 1005a, generates a driving pulse for an optical motor 1507 to drive a reader 1210 (FIG. 19).

The ADF 1300 is an automatic document feeder that enables high-speed document conveyance, and as described above, it is connected with the CPU 1501 via the I/F circuit 1512. The ADF 1300 is provided with a paper feed motor 1518, a leading motor 1519, a separating motor 1804, and a spacing motor 1805, and these four motors provide high-speed document conveyance. To closely monitor the behavior of a document being conveyed, a registration sensor 1520, a leading sensor 1521, a discharge sensor 1522, and a separation sensor 1806 are also provided. Output of these sensors 1520, 1521, 1522, 1806 are input to the CPU 1501, which then provides the driving timing for conveying the document and detects jamming in the ADF 1300 based on the received output of the sensors 1520, 1521, 1522, 1806. Thus, in the present embodiment, control over the ADF 1300 (and each of the motors) is performed by the CPU 1501.

The alignment unit 1002 is provided with an ASIC 1003, an EEPROM 1004 (non-volatile memory), an oscillation circuit 1005, and an I/F circuit 1005b. The ASIC 1003 controls the alignment unit 1002 based on data written in the EEPROM 1004. The data written in the EEPROM 1004 includes data that is for controlling the driving of the optical motor 1507 and that is independent of the specifications of the image reading apparatus 1R. Specifically, the data for controlling the driving of the optical motor 1507 is motor clock frequency data on the optical motor 1507 corresponding to the acceleration interval and the deceleration interval of the reader 1210. The data written in the EEPROM 1004 may be updated by the CPU 1501 via a write line 1008 as needed.

Connected to the ASIC 1003 are an inverter 1508, a home position sensor 1510, and document size detection sensors 1511a, 1511b. The inverter 1508 lights a document-illuminating lamp 1201 when an ON signal is input from the ASIC 1003. The lighting of the document-illuminating lamp 1201 is synchronized with the reading by the image reading apparatus 1R. That is, the lighting is synchronized with the activation of the optical motor 1507. The ASIC 1003 detects whether or not the reader 1210 is at the home position based on a signal from the home position sensor 1510. The ASIC 1003 also detects the size of a document placed on the platen glass 1203 based on signals from the document size detection sensors 1511a, 1511b. ASIC 1003 is connected with the CPU 1501 of the specific unit 1001 via a serial communication line 1007 to control operations according to commands from the CPU 1501. The ASIC 1003 also informs the CPU 1501 of the operation status via the serial communication line 1007. The ASIC 1003 further communicates with the specific unit 1001 on start-up of the image reading apparatus 1R. By this communication, the ASIC 1003 obtains identification information (ID) previously provided to the specific unit 1001 and deploys a speed table for the optical motor 1507 corresponding to the obtained identification information (ID) onto RAM (not shown) in the ASIC 1003. Based on the speed table, the ASIC 1003 generates control signals for the motor driver 1506 to control the driving of the optical motor 1507, and outputs the control signals to the motor driver 1506 via the I/F circuit 1005b.

The oscillation circuit 1005 supplies clocks of an optimal frequency to the ASIC 1003 according to the ID of the specific unit 1001 obtained on start-up of the image reading apparatus 1R. The ASIC 1003 converts these clocks into the base clocks for the motor clocks for driving the optical motor 1507. This clock conversion process will be described later.

The specific unit 1001 and the alignment unit 1002 are connected with each other via the I/F circuit 1005a and the I/F circuit 1005b.

In the configuration of the image reading apparatus 1R, the amount of load required for controlling the ADF 1300 is the same as that for the ADF 1300 in FIG. 24. However, the CPU 1501 can control the ADF 1300 without requiring provision of the slave CPU 1802 and the CPU 1803 as shown in FIG. 24. This is because the CPU 1501 need not perform some control, such as control associated with driving the optical motor 1507 and lighting the document-illuminating lamp 1201, while monitoring the output of the home position sensor 1510 and the document size detection sensors 1511a, 1511b.

Figure 2:
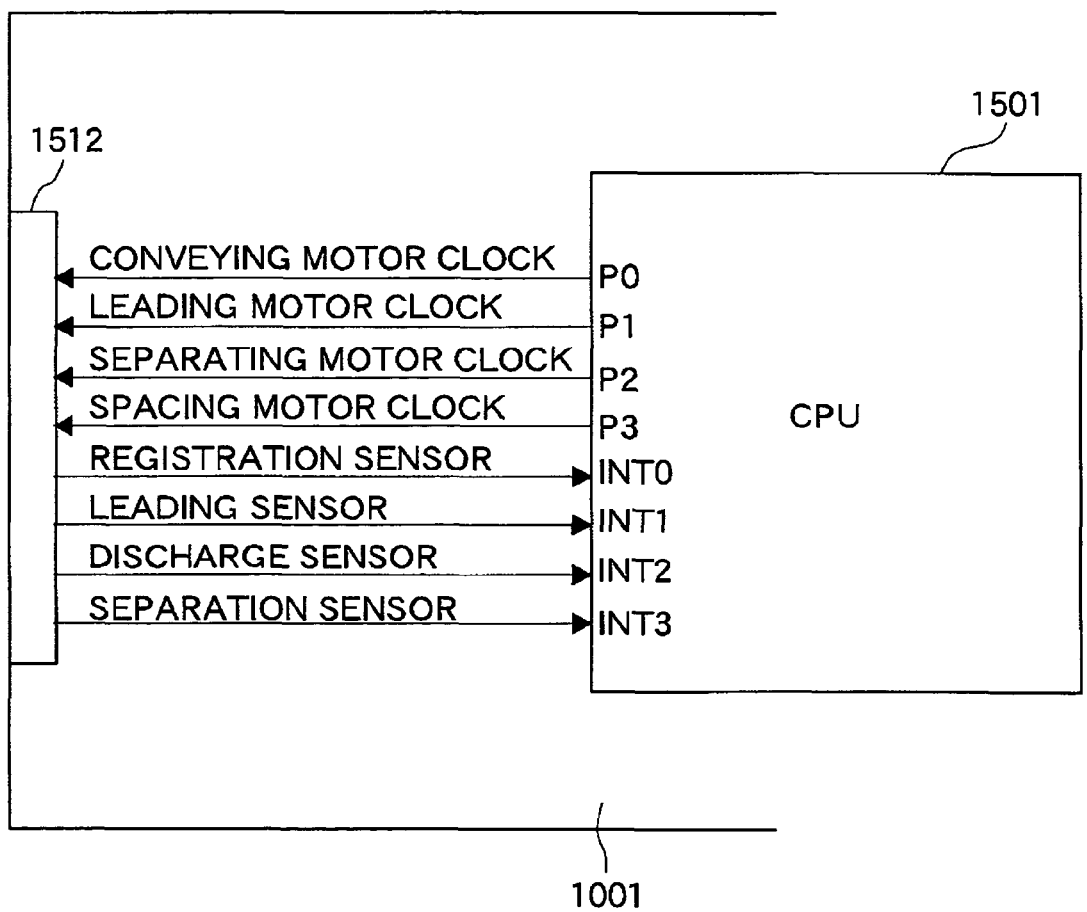
FIG. 2 is a diagram showing signals exchanged between a CPU and an ADF in FIG. 1 via an I/F circuit.

Now, signals exchanged between the CPU 1501 and the ADF 1300 via the I/F circuit 1512 will be described with reference to FIG. 2. FIG. 2 is a diagram showing signals exchanged between the CPU 1501 and the ADF 1300 in FIG. 1 via the I/F circuit 1512.

As shown in FIG. 2, the CPU 1501 is provided with input and output ports P0-P3, INT0-INT3. A conveying motor clock, a leading motor clock, a separating motor clock, and a spacing motor clock are output from the output ports P0-P3 to the I/F circuit 1512 respectively. Output of the registration sensor 1520, the leading sensor 1521, the discharge sensor 1522, and the separation sensor 1806 in the ADF 1300 shown in FIG. 1 are input to the input ports INT0-INT3 of the CPU 1501 respectively. The CPU 1501 controls to switch among the motor clocks to be output from the output ports P0-P3 according to the input to the respective input ports INT0-INT3.

Figure 20:
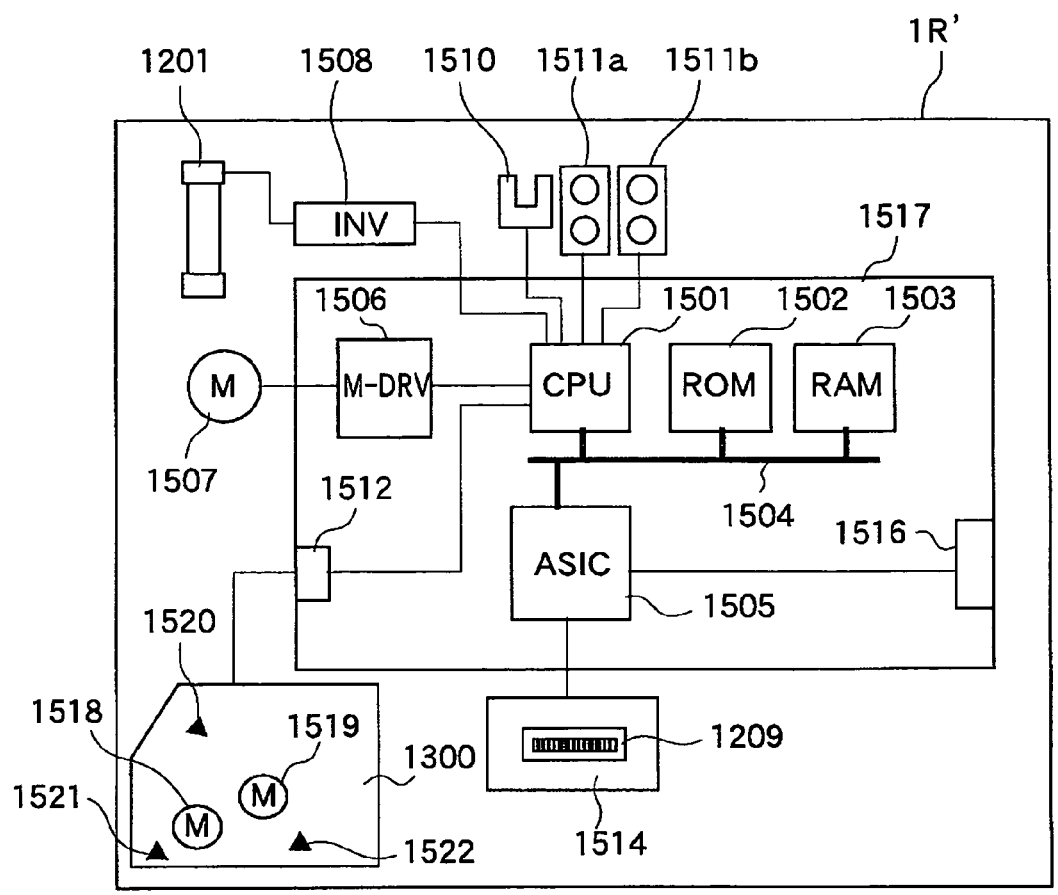
FIG. 20 is a block diagram showing an example of the configuration of the image reading apparatus of FIG. 19.
Figure 21:
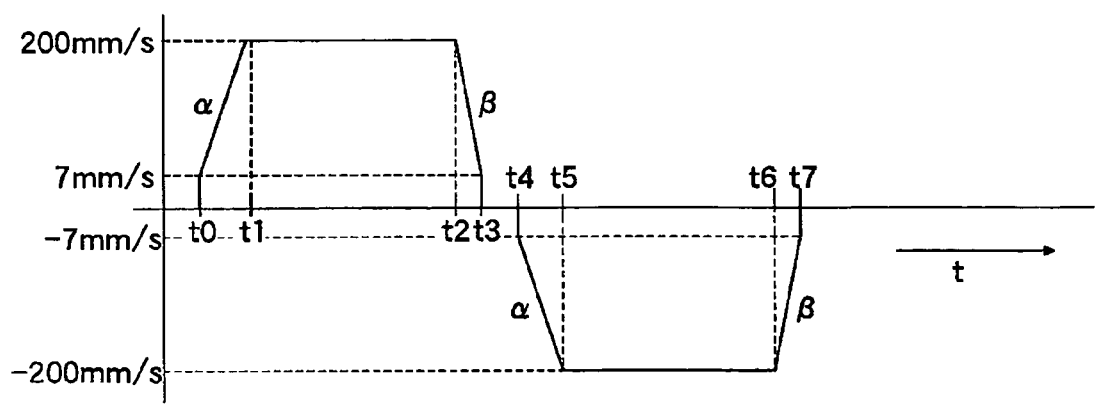
FIG. 21 is a timing chart showing a driving profile for an optical motor in the image reading apparatus of FIG. 20.
Figures 22A, 22B:
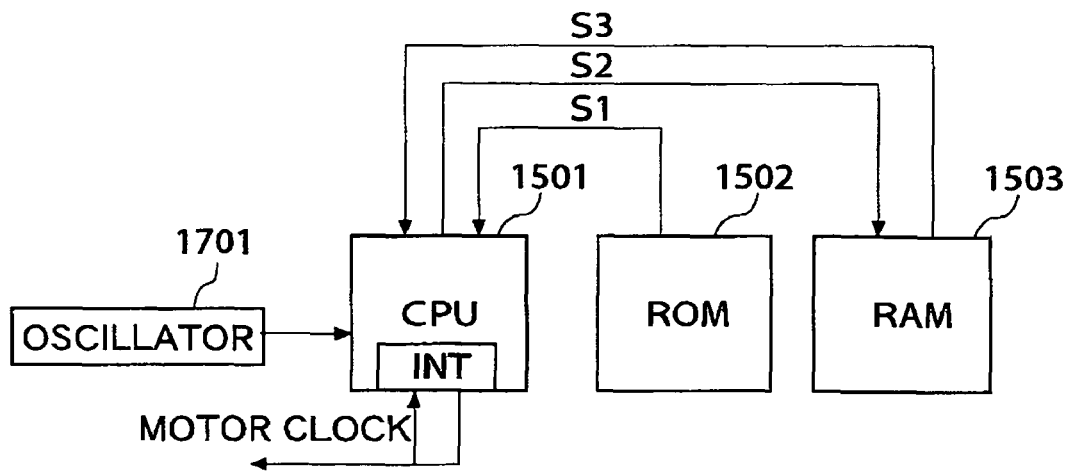
Figure 23:
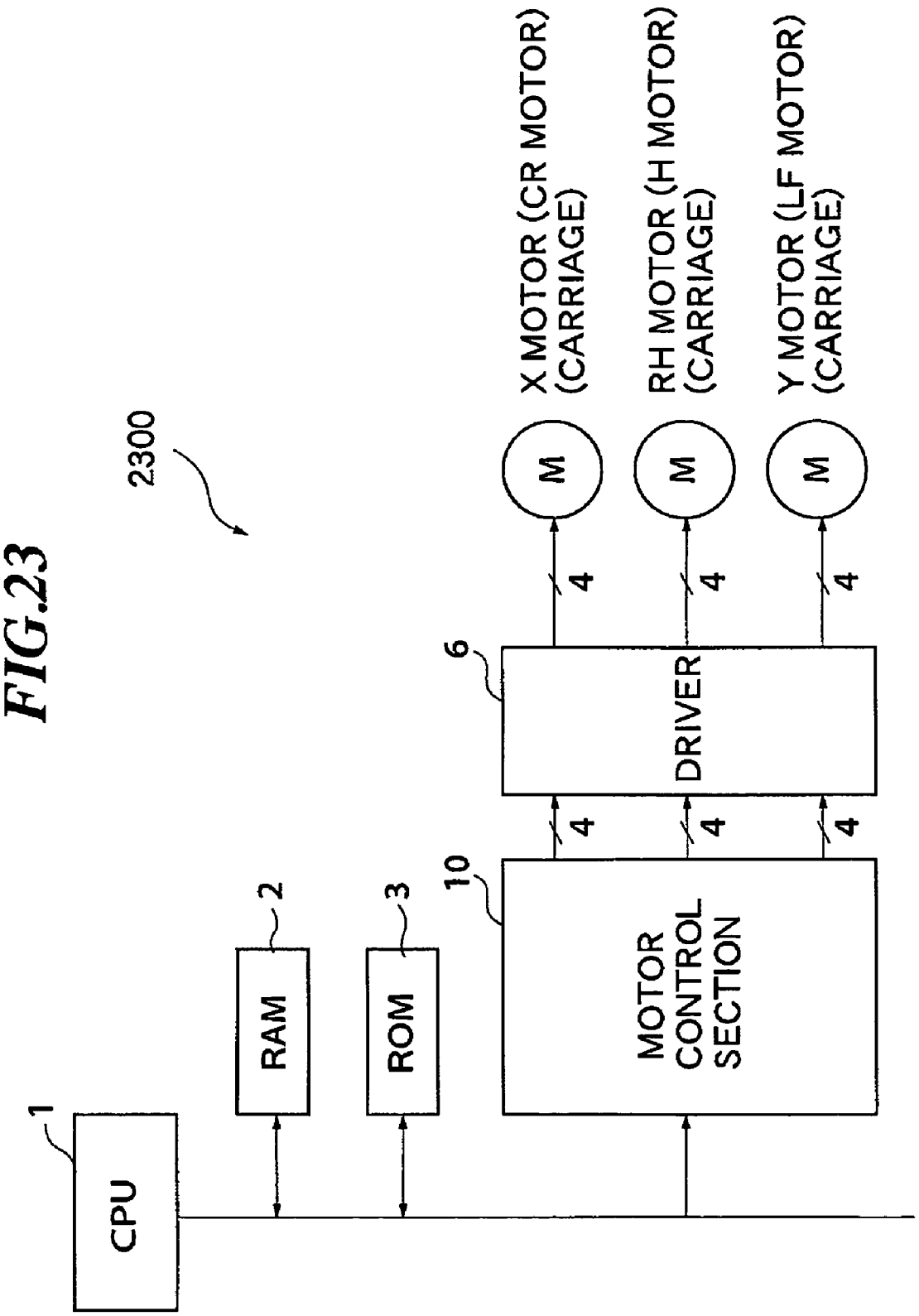
FIG. 23 is a block diagram showing the configuration of a conventional printer apparatus.

It is also possible to connect an ADF 1300 provided with, for example, the motors and sensors as shown in FIG. 20 to the specific unit 1001. In that case, outputting the separating motor clock from the output port P2, outputting the spacing motor clock from the output port P3, and inputting the output of the separation sensor 1806 to the input port INT3 are not performed. Therefore, a program for performing corresponding control may be stored on the ROM 1502. Thus, the same hardware design of the specific unit 1001 may be used regardless of the specifications of the image reading apparatus 1R.

Figure 3:
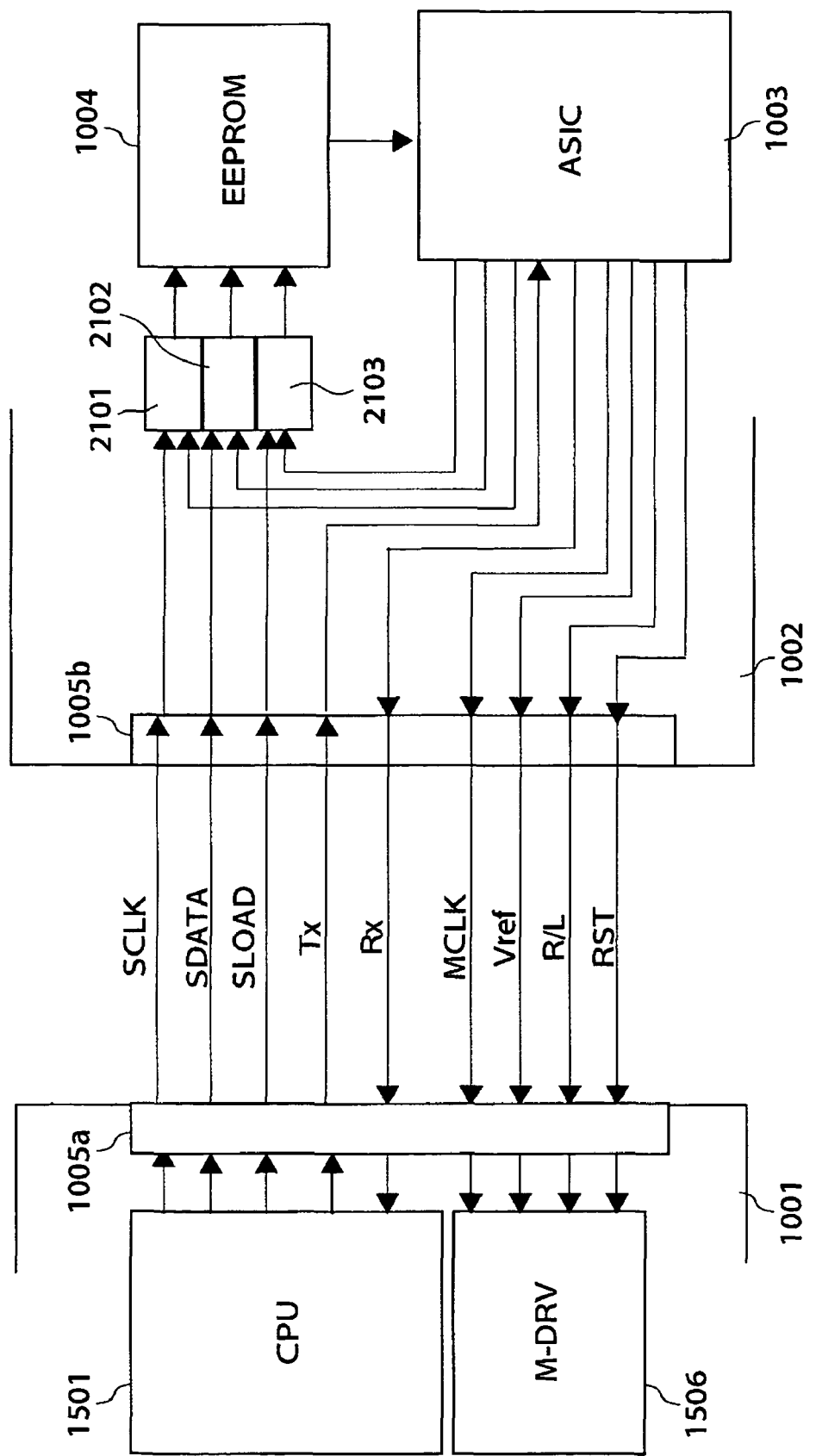
FIG. 3 is a diagram showing signals exchanged between a specific unit and an alignment unit in FIG. 1.

Now, the interfaces between the specific unit 1001 and the alignment unit 1002 will be described with reference to FIG. 3. FIG. 3 is a diagram showing signals exchanged between the specific unit 1001 and the alignment unit 1002 in FIG. 1.

The specific unit 1001 and the alignment unit 1002 are connected with each other via the respective I/F circuits 1005a, 1005b. The interface specifications of the I/F circuits 1005a, 1005b are determined independent of the specifications of the image reading apparatus 1R.

As shown in FIG. 3, signals exchanged between the I/F circuits 1005a, 1005b include a signal SCLK, a signal SDATA, a signal SLOAD, a signal Tx, a signal Rx, a signal (motor clock) MCLK, a signal Vref, a signal R/L, and a signal RST. The signal SCLK, the signal SDATA, and the signal SLOAD are signals for the CPU 1501 writing data to the EEPROM 1004, and these signals are input to gate circuits 2101-2103. Signals for the ASIC 1003 reading data from the EEPROM 1004 are also input to the gate circuits 2101 to 2103.

To prevent a conflict between write and read of data to/from the EEPROM 1004, the CPU 1501 and the ASIC 1003 exchange the signals Tx and Rx to check each other's status. This controls the access, where only one of the CPU 1501 and the ASIC 1003 is valid.

The signals MCLK, Vref, R/L, RST are input from the ASIC 1003 to the motor driver 1506. The signal MCLK is the base clock for driving the optical motor 1507. The signal Vref is a signal that indicates an analog voltage value for controlling the driving current for the optical motor 1507. The signal R/L is a logical signal that determines the rotation direction of the optical motor 1507. The signal RST is a signal that resets the internal logic of the motor driver 1506 as needed.

Figure 4:
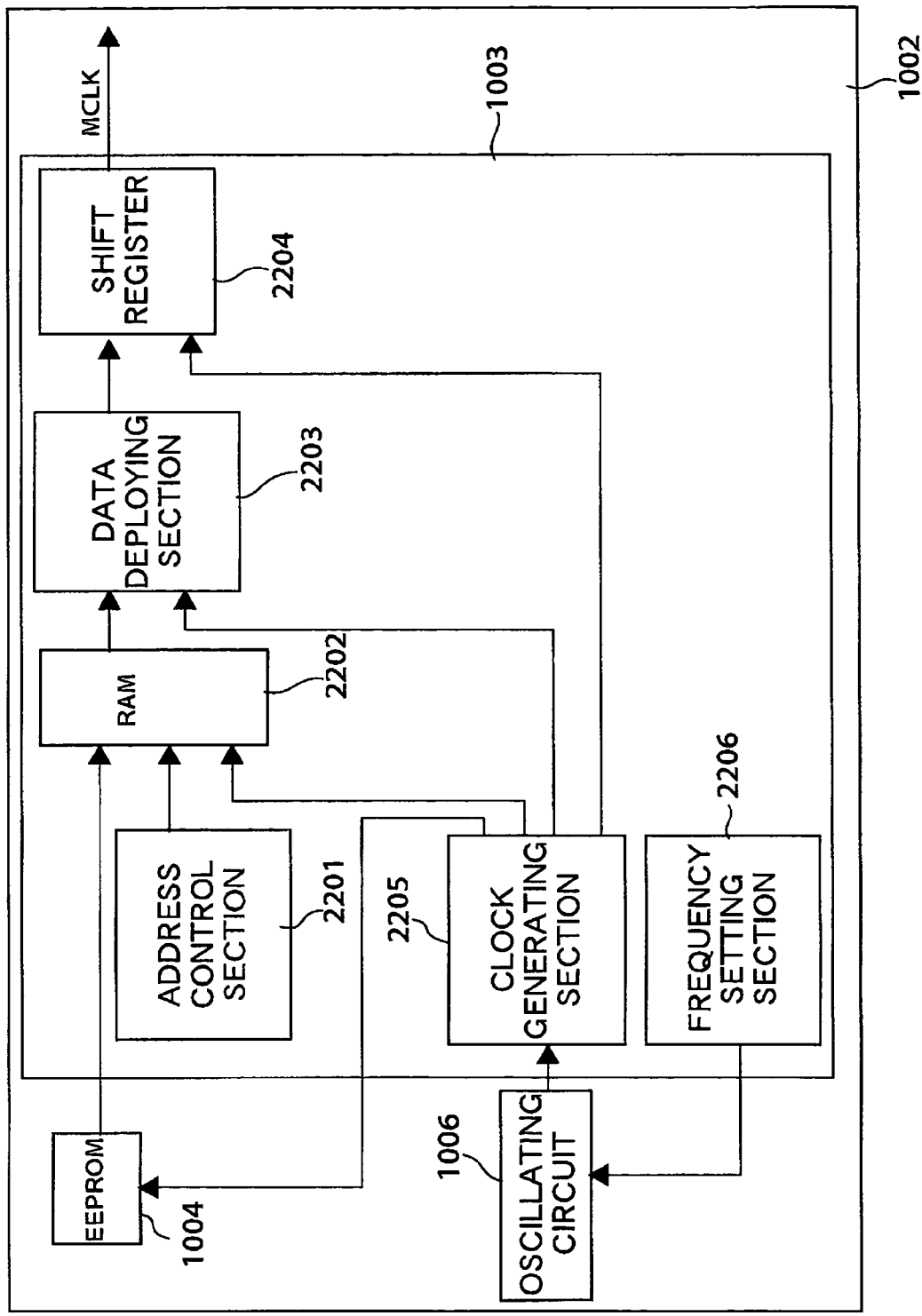
FIG. 4 is a block diagram showing the configuration of a circuit of the ASIC in FIG. 1 for generating a signal MCLK for the optical motor.

Now, control over the driving of the optical motor 1507 will be described with reference to FIG. 4. FIG. 4 is a block diagram showing the configuration of a circuit of the ASIC 1003 in FIG. 1 for generating the signal MCLK for the optical motor 1507.

As shown in FIG. 4, the ASIC 1003 is provided with an address control section 2201, a RAM 2202, a data deploying section 2203, a shift register 2204, a clock generating section 2205, and a frequency setting section 2206. Stored on the RAM 2202 is data that is read from the EEPROM 1004 (the motor clock frequency data on the optical motor 1507 corresponding to the acceleration interval and the deceleration interval of the reader 1210). Here, the address control section 2201 generates addresses corresponding to the identification information (ID) of the specific unit 1001 obtained by the communication with the specific unit 1001, and the read-out data is stored in the generated addresses. The distance from the start position of the reader 1210 to the leading end of a document is predefined for the identification information (ID). Therefore, the data for the acceleration interval, for example, is written to as many addresses as the number of clocks required for the acceleration interval. For example, assume that 100 data items are stored on the EEPROM 1004 as the data for the acceleration interval, and the number of clocks required for the acceleration interval predefined for the identification information (ID) is 85. Then, the address control section 2201 generates addresses for 85 data items so that 15 data items are thinned out at equal intervals among the 100 data items read from the EEPROM 1004. Similarly, in the case of the data for the deceleration interval, addresses for as many data items as the number of clocks required for the deceleration interval predefined for the ID are generated.

Instead of the above technique, data items may be thinned out when they are read from the EEPROM 1004, and all the read-out data may be written to the RAM 2202.

The clock generating section 2205, referencing the clocks oscillated by an oscillating circuit 1006, generates clocks for reading data from the EEPROM 1004, for generating the addresses in the address control section 2201, and for writing data to the RAM 2202. The oscillating circuit 1006 oscillates the clocks according to the frequency that is set by the frequency setting section 2206.

Figure 5A:
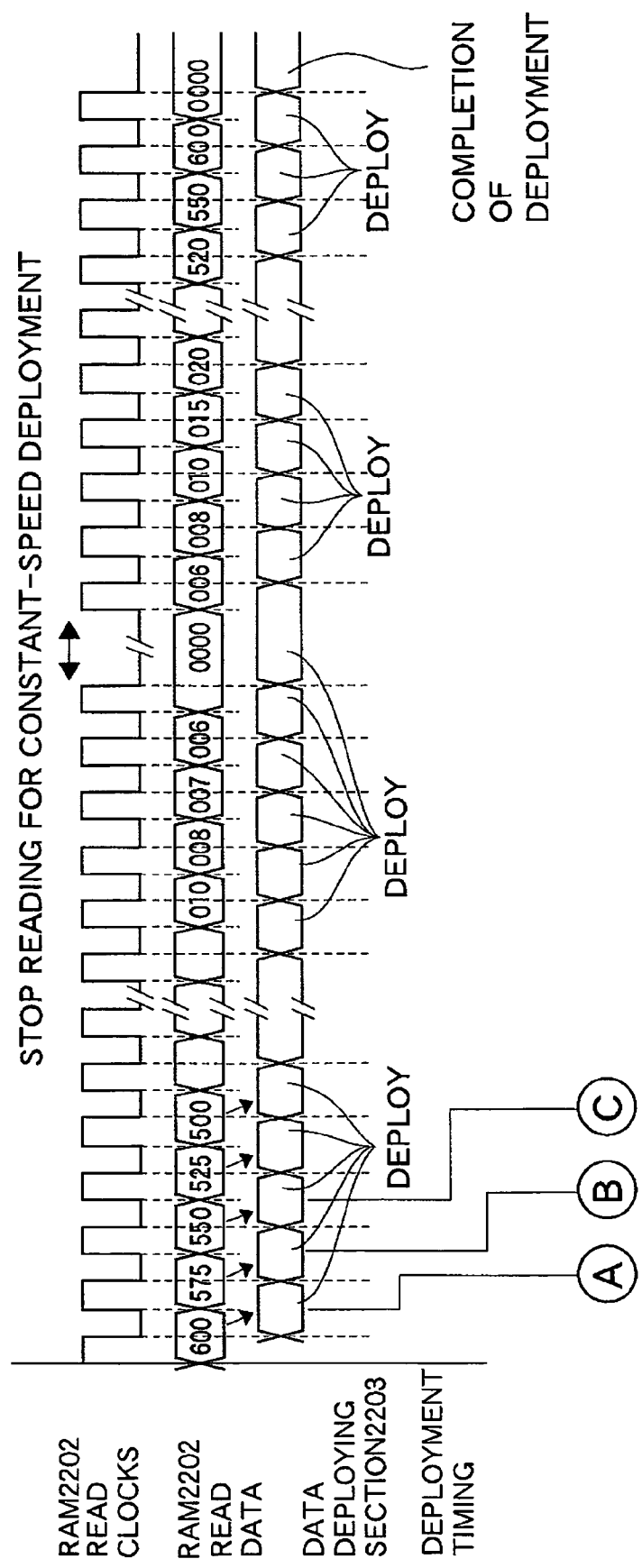
Figure 6A:
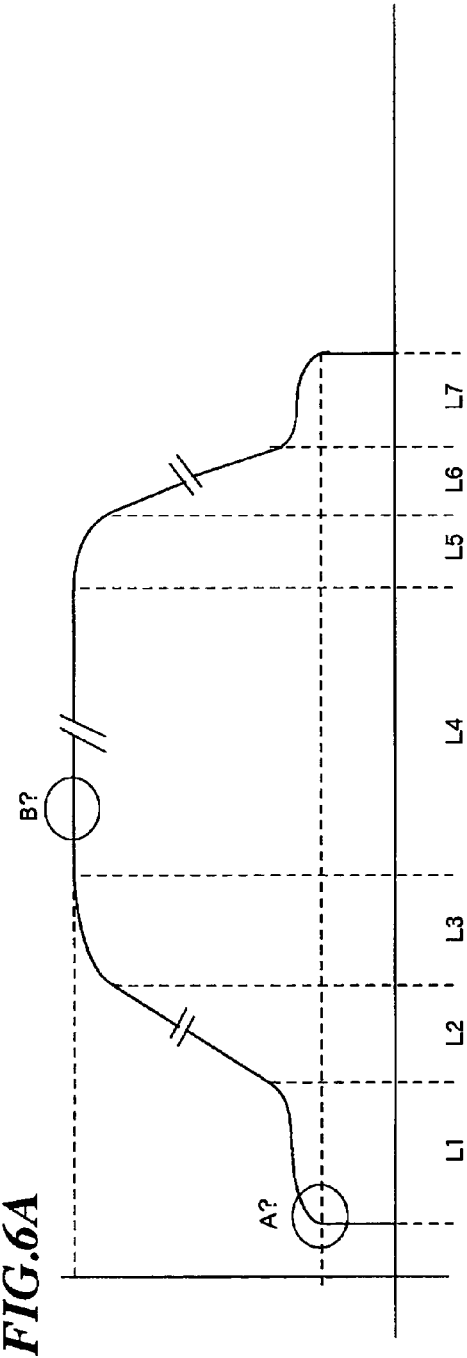
FIGS. 6A to 6B are a diagram showing a driving profile for the optical motor and its corresponding clock timing charts.
Figure 6B:
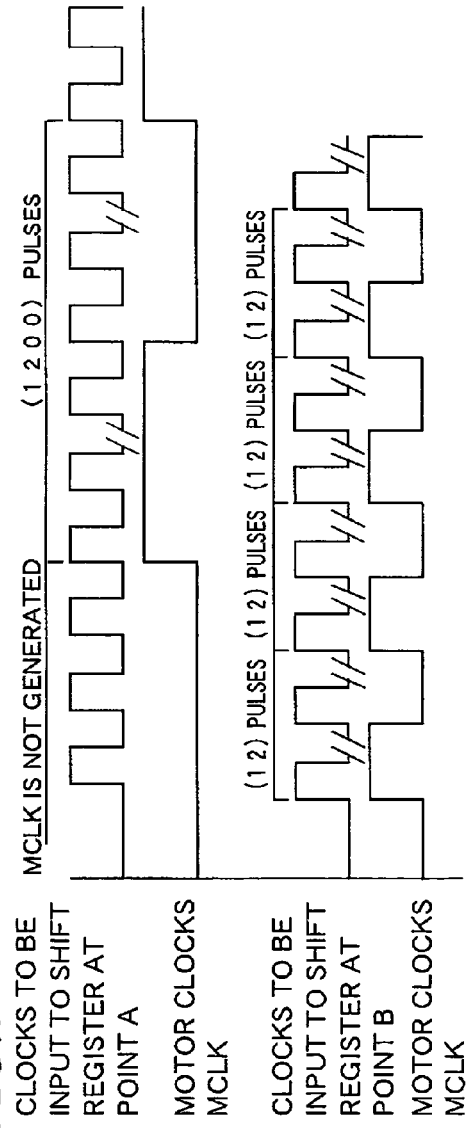

Now, operation timing of the RAM 2202, the data deploying section 2203, and the shift register 2204 will be described with reference to FIGS. 5A to 5C and 6. FIGS. 5A to 5C are diagrams showing an operation timing chart for the RAM 2202, the data deploying section 2203, and the shift register 2204 in FIG. 4. FIGS. 6A to 6B are a diagram showing a driving profile for the optical motor 1507 and its corresponding clock timing charts.

As shown in FIGS. 5A to 5C, data written to the RAM 2202 is read and input to the data deploying section 2203. The data deploying section 2003 deploys a pattern according to the input data. The deployed pattern is transferred to the shift register 2204, which loads the data concurrently with a rising edge of the output motor clock MCLK. The loaded data is output by one bit as the motor clock MCLK based on clocks of a predetermined frequency from the clock generating section 2205. The motor clocks MCLK that are output in this manner results in the driving profile for the optical motor 1507 shown in FIG. 6A.

Consider the motor clock MCLK at the start of acceleration (at the activation point A of the optical motor 1507 shown in FIG. 6B). If the read-out data is "600", for example, data of a cycle that consists of 600 pulses for the high interval and 600 pulses for the low interval, i.e., data of a cycle corresponding to 1200 base clocks is output as the motor clock MCLK. If the next read-out data is "575", the motor clock MCLK of a cycle corresponding to the total of 1150 base clocks is output, including 575 pulses for the high interval and 575 pulses for the low interval. Thereafter, the motor clocks MCLK are output in the same manner during the acceleration interval (the interval from L1-L3 in FIG. 6A). Then, the motor clock MCLK corresponding to data "006" for the end of the acceleration interval is output.

Following the data "006" for the end of the acceleration interval, predetermined data is read, for example "000". This data represents code indicating that the preceding data "006" provides a motor clock MCLK for a constant speed.

Once this predetermined data is read, the reading of data from the RAM 2202 is stopped and the deployment of the motor clocks MCLK for the constant-speed interval is started. For example, if the length in the direction of reading by the reader 1210 is recognized as 420 mm based on the identification information (ID) of the specific unit 1001, the motor clocks MCLK corresponding to 420 mm are output (see the point B in FIG. 6B). Each of these motor clocks MCLK has a cycle of 12 base clocks.

On termination of the constant-speed interval (the interval L4 in FIG. 6A), reading of data from the RAM 2202 for the deceleration interval (the interval from L5-L7 in FIG. 6A) is started. The initial data for the deceleration interval is the same as the data for the end of the acceleration interval, as well as the data for the constant-speed interval. Thus, once data "006" is read, data is sequentially read from the RAM 2202, and the motor clocks MCLK of predetermined cycles are output, as in the case of the acceleration intervals. On termination of the deceleration interval, data "000" is read from the RAM 2202, and the driving of the optical motor 1507 is terminated.

In the present embodiment, as shown in the driving profile in FIG. 6A, the optical motor 1507 is driven in the sections L1 and L3 of the acceleration interval to move the reader 1210 according to a nonlinear acceleration curve. In the section L2, the optical motor 1507 is driven to move the reader 1210 according to a linear acceleration curve. In the sections L5 and L7 of the deceleration interval, the optical motor 1507 is driven to move the reader 1210 according to a nonlinear deceleration curve. In the section L6, the optical motor 1507 is driven to move the reader 1210 according to a linear deceleration curve.

In this manner, while minimizing the amount of the program (the size of the EEPROM 1004), the present embodiment can realize a driving profile that includes the acceleration and deceleration intervals with sections in which the acceleration and deceleration curves are nonlinear.

For example, if linear acceleration and deceleration are to be performed in the acceleration and deceleration intervals in a conventional manner, the optical motor 1507 activated at a high speed may increase the motor activation sound and be offensive to the operator. Reducing the speed of the optical motor 1507 on activation in order to suppress the motor activation sound requires rapidly bringing the reader 1210 to the speed of the constant-speed interval, which increases the acceleration. As a result, the reader 1210 may vibrate when transitioning from the acceleration interval to the constant-speed interval, thereby causing a blur in the image read by the reader 1210 (the image at the leading end of the document).

To achieve both the reduction in the activation sound and the prevention of a blur in the image at the leading end of the document, nonlinear acceleration in the acceleration interval and nonlinear deceleration in the deceleration interval may be performed as in the present embodiment. However, the program then needs to have a cycle for each motor clock MCLK. This results in a huge amount of program. Therefore, the present embodiment uses data for a half cycle of a motor clock MCLK as data about the driving profile of the acceleration interval and the deceleration interval. A clock for one cycle may be generated from this data, and the motor clocks MCLK for the constant-speed interval may be generated by reusing the last data for the acceleration interval. This can minimize the amount of the program for generating the driving profile (the size of the EEPROM 1004).

To enable a higher-speed reading than, e.g., the driving profile shown in FIG. 6A, the setting of the oscillating circuit 1006 may be modified so that the oscillating circuit 1006 generates the base clocks of a higher frequency.

Thus, with a smaller amount of program, the above-described configuration can provide the image reading apparatus 1R that produces a smaller activation sound and prevents a blur in reading at the leading end of the image.

At the time of development of the alignment unit 1002, the specifications of the image reading apparatus 1R to be developed in the future are not apparent. Therefore, when the specific unit 1001 of the image reading apparatus 1R developed later informs the alignment unit 1002 of the identification information (ID), the alignment unit 1002 may not be able to recognize the identification information (ID). In this case, the alignment unit 1002 requests additional information from the specific unit 1001. The additional information may include the distance of the acceleration interval, the distance of the deceleration interval, and the speed information in the constant-speed interval.

Since data may be written to the EEPROM 1004 by the CPU 1501, flexible adaptation is possible when the content of the data in the EEPROM 1004 needs to be updated in the future. For example, a significant change in members of the reader 1210 or the material of the members may cause changes in the behavior of the image blur at the leading end of the document and in the sound (sound pressure or tone) on activation of the optical motor 1507. Data may be effectively updated to adapt to these changes.

The update data may be obtained from an external device (not shown) or obtained by replacing the EEPROM 1004. In the former case, the data is input from the external device to the CPU 1501 via the I/F circuit 1516 and the image processing ASIC 1505. The CPU 1501 overwrites the data in the EEPROM 1004 with the input data via the I/F circuits 1005*a*, 1005*b*. In the latter case, an IC of DIP type is used as the EEPROM 1004, and the EEPROM 1004 is implemented to the alignment unit 1002 via an IC socket. This allows the EEPROM 1004 to be exchanged for (replaced with) one to which data has been written by an external writer.

When new design or control specifications are developed for the image reading apparatus 1R in the future, employing the above configuration will allow the same alignment unit 1002 to be used unmodified and only the specific unit 1001 to be newly designed. In addition, interfaces that comply with predetermined specifications may be used as the interface to the alignment unit 1002 and the interface to the ADF 1300 in the newly designed specific unit 1001. This facilitates reuse of the design concept, and the reduction in the design period and development period can be expected.

Although the present embodiment uses the ASIC 1003 as the control means implemented in the alignment unit 1002, this is not a limitation. Rather, as in the case of the specific unit 1001, the CPU 1501 may be implemented. Alternatively, the control means may be configured as a combination of the CPU 1501 and the ASIC 1003.

Figure 7:
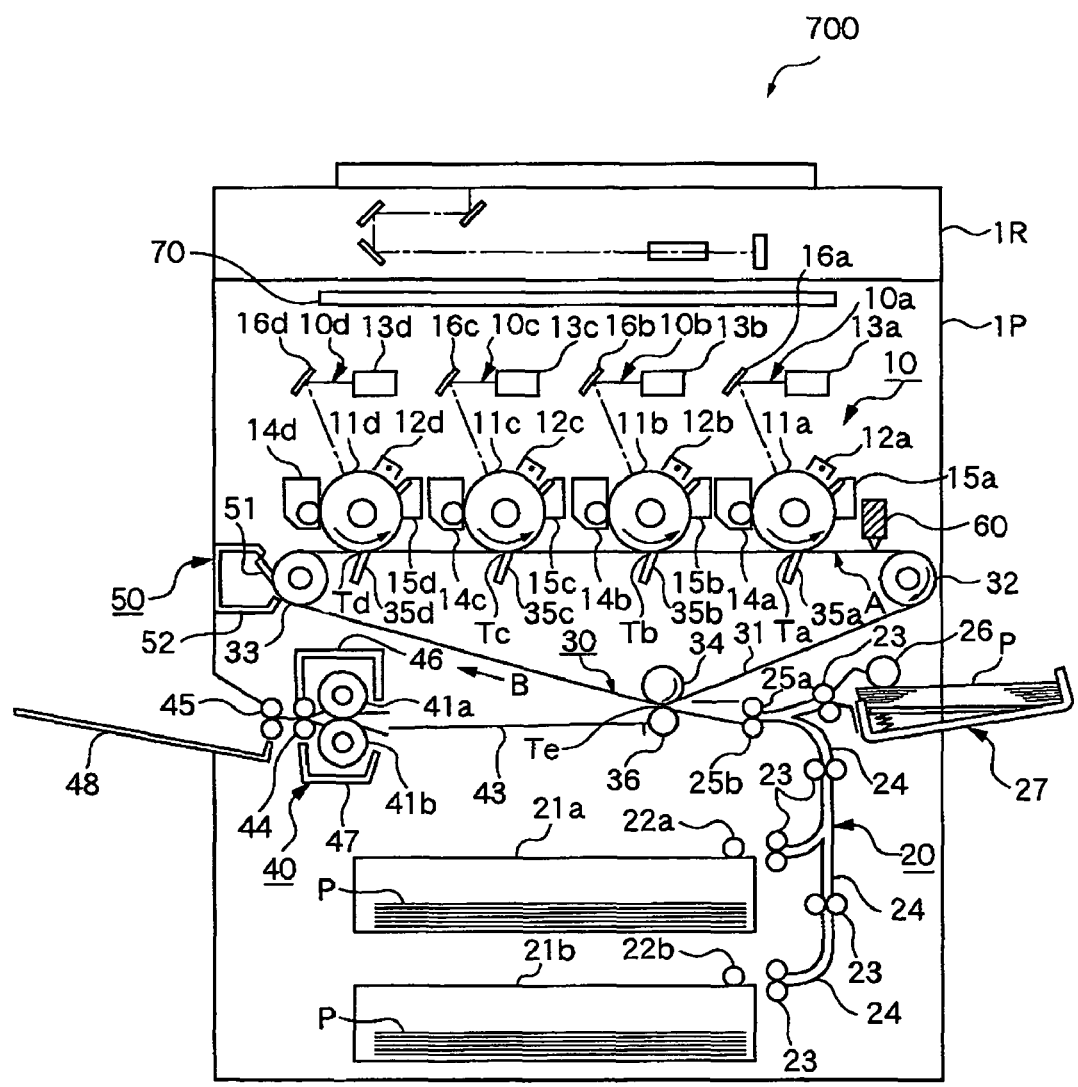
FIG. 7 is a longitudinal sectional view showing the configuration of an image forming apparatus provided with the image reading apparatus.
Figure 8:
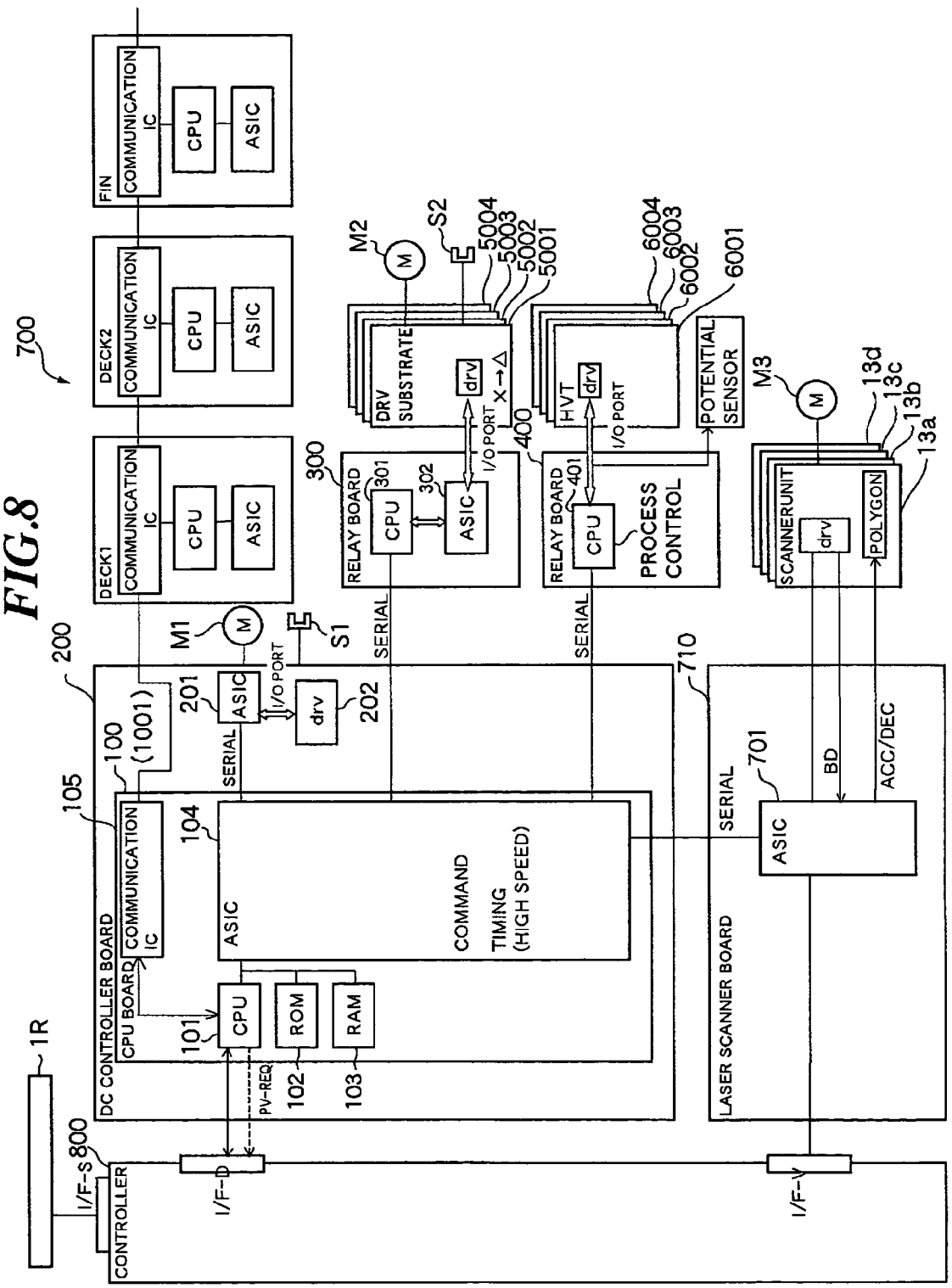
FIG. 8 is a block diagram showing the configuration of the image forming apparatus.

Now, an image forming apparatus provided with the image reading apparatus 1R will be described with reference to FIGS. 7, 8. FIG. 7 is a longitudinal sectional view showing the configuration of the image forming apparatus provided with the image reading apparatus 1R, and FIG. 8 is a block diagram showing the configuration of the image forming apparatus.

In FIG. 7, the image forming apparatus 700 is a color-copying machine including the image reading apparatus 1R and a printer 1P. The printer 1P employs a tandem approach using an electrophotographic process and forms on a transfer material P a color image read by the image reading apparatus 1R.

Specifically, the printer 1P has an image forming section 10 including four stations 10*a*, 10*b*, 10*c*, 10*d*, a paper feed unit 20, an intermediate transfer unit 30, a fixing unit 40, and a control section 70. The stations 10*a*-10*d* of the image forming section 10 includes photosensitive drums 11*a*-11*d* respectively, which are driven to rotate in the direction of the arrows shown in FIG. 7. These photosensitive drums 11*a*-11*d* are for corresponding colors (cyan, magenta, yellow, and black) respectively. Placed around the photosensitive drums 11*a*-11*d* are primary electrostatic chargers 12*a*-12*d*, scanner units 13*a*-13*d*, reflecting mirrors 16*a*-16*d*, developing devices 14*a*-14*d*, and cleaners 15*a*-15*d* respectively. The primary electrostatic chargers 12*a*-12*d* are for electrifying the surface of the corresponding photosensitive drums 11*a*-11*d* at a predetermined potential. The scanner units 13*a*-13*d* are devices for modulating a laser beam based on an input image signal, and exposing and scanning the surface of the corresponding photosensitive drums 11*a*-11*d* with the modulated laser beam via the reflecting mirrors 16*a*-16*d*. This exposure and scanning forms electrostatic latent images on the photosensitive drums 11a-11d according to the image signal. The developing devices 14a-14d are for supplying toner of a corresponding color onto the corresponding photosensitive drums 11a-11d and providing visible toner images of the electrostatic latent images formed on the corresponding photosensitive drums 11a-11d. The cleaners 15a-15d are devices for taking away the remaining toner on the corresponding photosensitive drums 11a-11d.

The intermediate transfer unit 30 includes an intermediate transfer belt 31 on which the toner images formed on the photosensitive drums 11a-11d are sequentially transferred in layers in primary transfer areas Ta, Tb, Tc, Td respectively. The intermediate transfer belt 31 winds around a driving roller 32, a follower roller 33, and a secondary transfer counter roller 34 that is opposed to a secondary transfer position Te across the intermediate transfer belt 31.

Electrostatic chargers 35a-35d for primary transfer are provided at the positions opposed to the primary transfer areas Ta, Tb, Tc, Td across the intermediate transfer belt 31. A secondary transfer roller 36 is provided at the position opposed to the secondary transfer counter roller 34 across the intermediate transfer belt 31, so that the secondary transfer area Te is provided by a nip formed between the secondary transfer roller 36 and the intermediate transfer belt 31. The secondary transfer roller 36 is pressed against the intermediate transfer belt 31 at an appropriate pressure. A cleaning blade 51 for cleaning the image forming surface of the intermediate transfer belt 31, and a waste toner box 52 for receiving waste toner are provided downstream from the secondary transfer area Te.

The paper feed unit 20 includes cassettes 21a, 21b and a manual feed tray 27 for containing transfer materials P. The cassettes 21a and 21b and the manual feed tray 27 are provided with pickup rollers 22a, 22b, 26 respectively for feeding the transfer materials P one by one. Transfer materials P sent from the cassette 21a, 21b, and the manual feed tray 27 by the respective pickup roller 22a, 22b, 26 are conveyed to registration rollers 25a, 25b by a pair of paper feed rollers 23 and a paper feed guide 24, and stopped at the registration rollers 25a, 25b. The stopped transfer material P is sent by the registration rollers 25a, 25b to the second transfer area Te in synchronization with the image forming of the image forming section 10. In the secondary transfer area Te, the toner image (full-color toner image) transferred onto the intermediate transfer belt 31 is transferred onto the transfer material P. The transfer material P that has come out of the secondary transfer area Te is sent to the fixing unit 40 guided with a guide 43.

The fixing unit 40 includes a pair of rollers 41 that consists of a fixing roller 41a and a pressing roller 41b. A nip portion is formed between the fixing roller 41a and the pressing roller 41b for nipping and conveying the transfer material P. When the transfer material P sent guided with the guide 43 passes through the nip portion, the toner image on the transfer material P is subjected to a thermal pressure and fixed on the transfer material P. The transfer material P that has passed through the nip portion is discharged outside the printer 1P via an internal discharge roller 44 and an external discharge roller 45.

In this type of tandem image forming apparatus 700, misalignment in registration or what is called color misalignment (misregistration) may occur in the color toner images formed on the photosensitive drums 11a-11d. This is caused by an error in mechanical attachment among the photosensitive drums 11a-11d, a difference in the optical path length of the laser beams generated by the exposure sections 13a-13d, a deviation of the optical path, warpage due to the ambient temperature of the LED, and so forth. To correct this misregistration, a registration sensor 60 that detects the misregistration is provided downstream from all the stations 10a, 10b, 10c, 10d. The registration sensor 60 is on the toner transfer area surface A at the position passed after all colors of cyan, magenta, yellow, and black are transferred and before the belt 31 wraps around at the driving roller 32.

As shown in FIG. 8, a control section 70 has a controller 800 for controlling the entire image forming apparatus 700. The controller 800 is provided with a plurality of interfaces I/F-S, I/F-D, I/F-V. The interface I/F-S is connected with the image reading apparatus 1R, the interface I/F-D is connected with a DC controller board 200, and the interface I/F-V is connected with a laser scanner board 710. The DC controller board 200 is a controller for controlling the printer apparatus 1P and includes a CPU board 100 correspond to the specific unit 1001, an ASIC 201, and a driver (drv) 202.

The CPU board 100 is provided with a CPU 101, a ROM 102, a RAM 103, an ASIC 104, and a communication IC 105. The CPU 101 executes a program stored on the ROM 102 by using the RAM 103 as a work area. According to the program, the CPU 101 generates control commands and so forth for the motors, the primary electrostatic chargers, and a high voltage generator for transfer respectively, while monitoring received output and so forth input from each driver.

A corresponding one of the generated commands is provided to each of devices such as paper feed decks DECK 1, DECK 2 and a finisher FIN via the communication IC 105. The devices such as the paper feed decks DECK 1, DECK 2 and the finisher FIN are optional devices provided as needed. A corresponding control command is also provided to the driver 202 via the ASIC 104 and the ASIC 201. The driver 202 drives a motor M1 based on the provided control command while monitoring output of a sensor S1. A corresponding control command is also provided to each of relay boards 300, 400 via the ASIC 104. The relay board 300 has a CPU 301 and an ASIC 302. Based on the provided command, the CPU 301 generates control signals and so forth for driving a plurality of motors respectively. Each of the control signals generated by the CPU 301 is input to corresponding driver substrates 5001-5004 via the ASIC 302. For example, based on the input control signal, the driver substrate 5001 drives a motor M2 while monitoring output of a sensor S2. The relay board 400 has a CPU 401. The CPU 401 generates control signals for operating a plurality of high voltage generators respectively while monitoring output of corresponding sensors, for example a potential sensor. Each of the control signals generated by the CPU 401 is input to the corresponding high voltage generators (HVTs) 6001-6004, which operate based on the input control signals. A corresponding control command is also provided to a laser scanner board 710 via the ASIC 104. The laser scanner board 710 has an ASIC 701. An image signal read by the image reading apparatus 1R is input to the ASIC 701 via the controller 800. The ASIC 701 respectively generates driving signals for scanner units 13a-13d based on the control command from the ASIC 104 and the input image signal while monitoring BD signals input from the scanner units 13a-13d. The driving signals for the scanner units 13a-13d are input to the scanner units 13a-13d respectively. The scanner units 13a-13d emit laser beams based on the driving signals and drive a driving motor M3 for a polygon mirror so that the laser beams perform exposure and scanning of the corresponding photosensitive drums 11a-11d.

Figure 9:
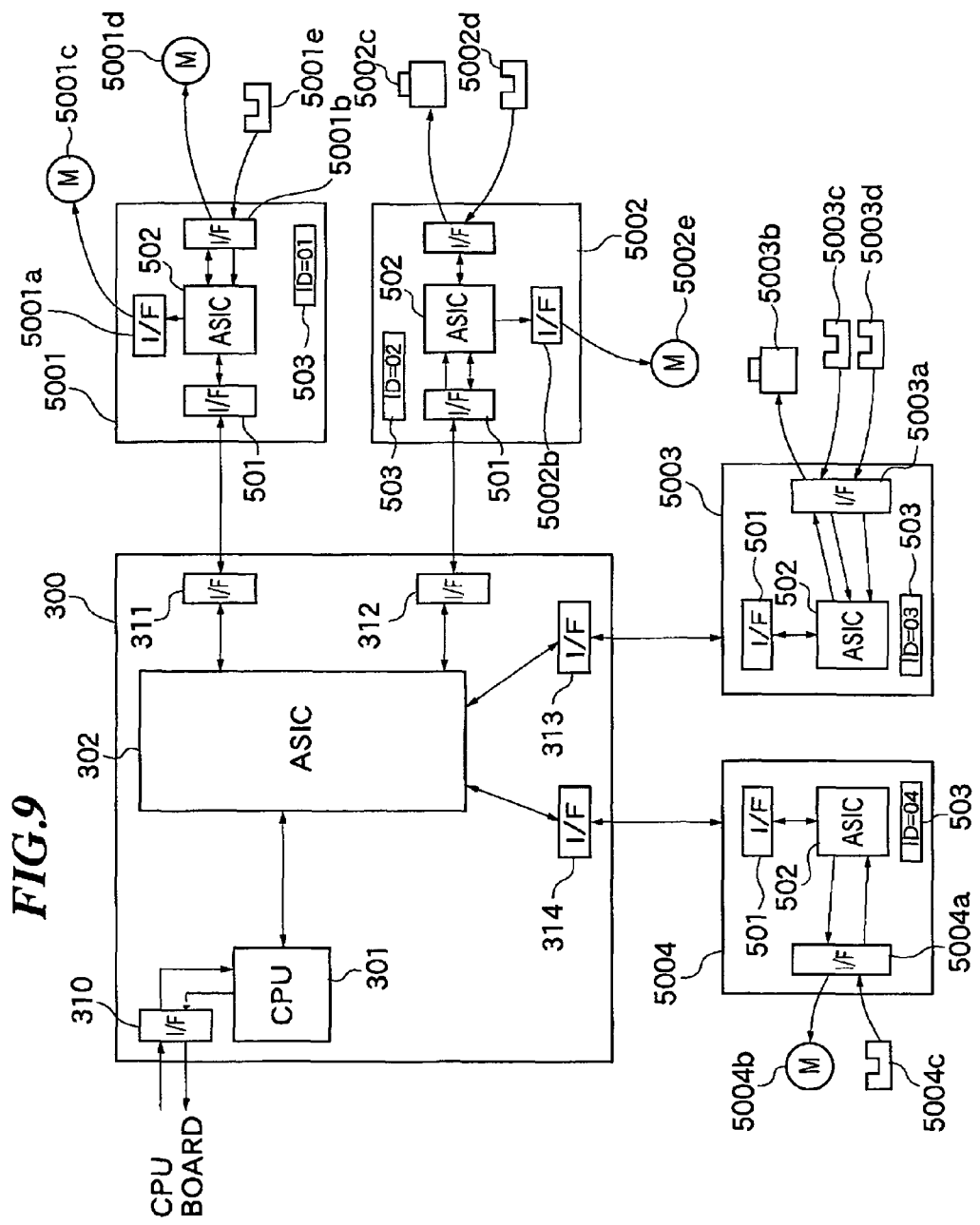
FIG. 9 is a block diagram showing the configuration of a relay board in FIG. 8.

Now, the relay board 300 will be described with reference to FIG. 9. FIG. 9 is a block diagram showing the configuration of the relay board 300 in FIG. 8.

In FIG. 9, the relay board 300 is a unit for absorbing differences between the interfaces on driver substrates 5001-5004 and the interfaces on the CPU board 100 of the DC controller board 200 in FIG. 8, and for performing fine control according to the characteristics of the driver substrates 5001-5004. The relay board 300 has a CPU 301, an ASIC 302, and a plurality of I/Fs (interfaces) 310-314. The I/F 310 is an interface for connection with the CPU board 100 in FIG. 8. The I/Fs 311-314 are interfaces for connection with the corresponding driver substrates 5001-5004.

The driver substrate 5001 is a driver for driving the motors of a paper feed system for feeding papers. The driver substrate 5001 has an ASIC 502, a plurality of I/Fs 501, 5001a, 5001b, and ID maintaining means 503. Via the I/F 501, the ASIC 502 receives input of control signals from the relay board 300, and sends output of a sensor 5001e connected to the I/F 5001b and output of an ID maintained in the ID maintaining means 503 to the relay board 300. According to the input control signals, the ASIC 502 drives corresponding motors 5001c and 5001d.

The driver substrate 5002 is a driver for driving the driving motors of a conveying system for conveying papers and has the same configuration as the driver substrate 5001. The driver substrate 5003 is a driver for driving the driving motors of a double-sided conveying system for carrying papers via a double-sided path and has the same configuration as the driver substrate 5001. The driver substrate 5004 is a driver for driving the driving motors of a discharging system for discharging papers and has the same configuration as the driver substrate 5001.

Figure 10:
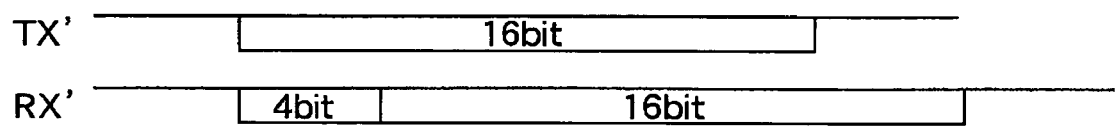
FIG. 10 is a diagram showing signals exchanged between a driver substrate and the relay board in FIG. 9.
Figure 11:
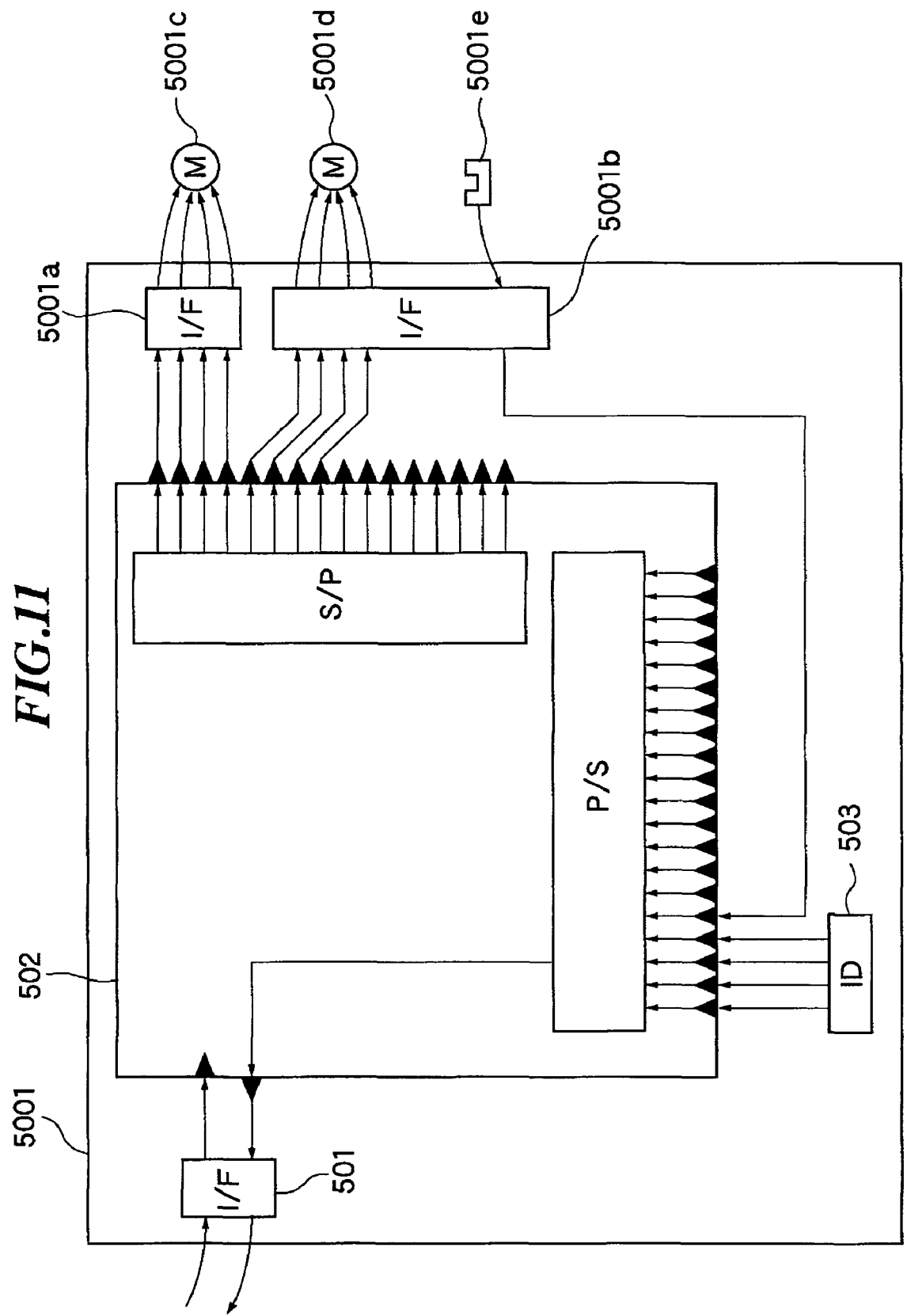
FIG. 11 is a diagram schematically showing conversion of signals Rx and Tx in FIG. 10.
Figure 12:
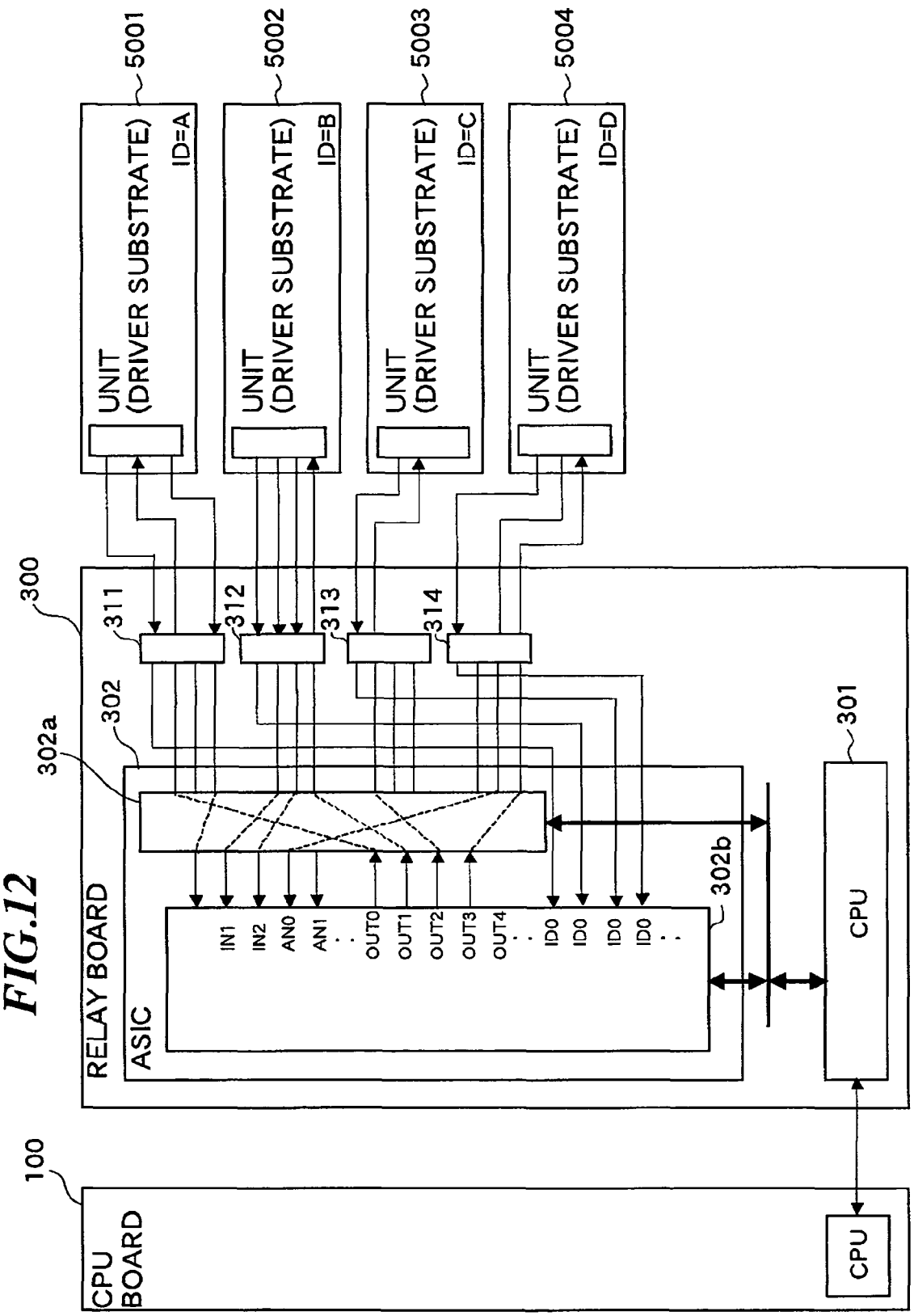
FIG. 12 is a block diagram showing the configuration of an interface to the driver substrate.

Now, signals exchanged between the driver substrate 5001 and the relay board 300 are described with reference to FIGS. 10 to 12. FIG. 10 is a diagram showing signals exchanged between the driver substrate 5001 and the relay board 300 in FIG. 9. FIG. 11 is a diagram schematically showing conversion of the signals Rx and Tx in FIG. 10. FIG. 12 is a block diagram showing the configuration of an interface to the driver substrate 5001.

In. FIG. 10, the relay board 300 transmits a 16-bit serial signal Tx' to the driver substrate 5001. The driver substrate 5001 transmits a 20-bit serial signal Rx' to the relay board 300. In this signal Rx', the first four bits indicate the ID maintained in the ID maintaining means 503. Among the remaining bits, one bit indicates output of the sensor 5001e and another 14 bits are reserved.

Specifically, as shown in FIG. 12, the ASIC 302 of the relay board 300 has a parallel-serial/serial-parallel converter means 302b that performs parallel-serial conversion or serial-parallel conversion of input/output signals. The ASIC 302 also has a connection/modification means 302a that can programmably connect/modify the input/output signals.

On the driver substrate 5001, as shown in FIG. 11, the serial signal Tx' received from the relay board 300 via the I/F 501 is input to the ASIC 502. The ASIC 502 converts the input serial signal Tx' into a parallel signal in which corresponding four bits are output to the motor 5001c via the I/F 5001a. Another corresponding four bits are output to the motor 5001d via the I/F 5001b.

The ASIC 502 receives output of the sensor 5001e via the I/F 5001b and receives the ID maintained in the ID maintaining means 503. These input signals are converted into the serial signal Rx', which is output from the ASIC 502 to the relay board 300 via the I/F 501.

Signals exchanged between the driver substrates 5002-5004 and the relay board 300 will not be described here because they are similar to those exchanged between the driver substrate 5001 and the relay board 300.

Figure 13:
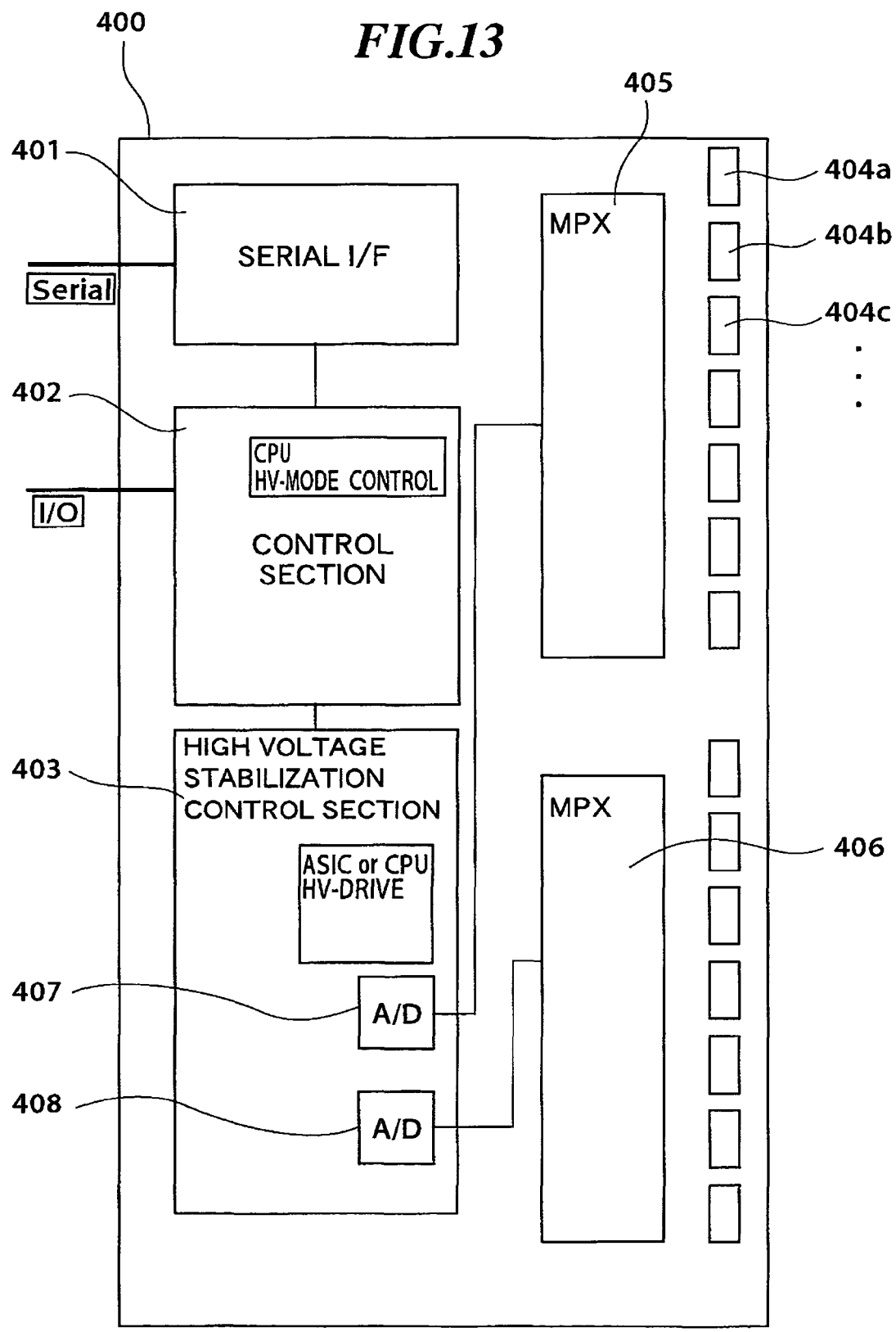
FIG. 13 is a block diagram showing the configuration of the relay board in FIG. 8.
Figure 14:
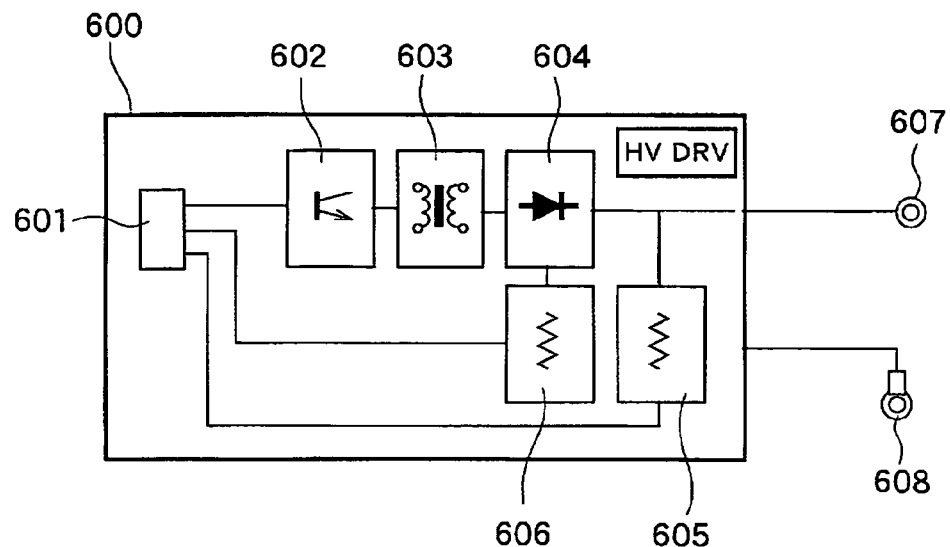
FIG. 14 is a block diagram showing the configuration of high voltage generators (HVTs) in FIG. 13.

Now, the relay board 400 and the high voltage generators (HVTs) 6001-6004 connected thereto will be described with reference to FIGS. 13 and 14. FIG. 13 is a block diagram showing the configuration of the relay board 400 in FIG. 8. FIG. 14 is a block diagram showing the configuration of the high voltage generators (HVTs) 6001-6004 in FIG. 13.

In FIG. 13, the relay board 400 has a serial I/F 401, a control section 402, a high voltage stabilization control section 403, a plurality of multiplexers 405, 406, and connectors 404a, 404b, 404c, . . . . The control section 402 performs serial communication with the CPU board 100 in FIG. 8 via the serial I/F 401. Specifically, the control section 402 receives commands from the CPU board 100 via the serial I/F 401 and sequentially controls the operation of the high voltage generators 6001-6004. The high voltage stabilization control section 403 performs control for stabilizing output of the high voltage generators 6001-6004 in response to sequential instructions from the control section 402. The high voltage stabilization control section 403 is provided with A/D converters 407, 408 corresponding to the multiplexers 405, 406. The multiplexers 405, 406 sort signals that are input or output via the corresponding connectors 404a, 404b, 404c, . . . .

Each of the high voltage generators 6001-6004 has the same configuration. Since they all have the same configuration, their configuration will be described below as that of a high voltage generator 600.

As shown in FIG. 14, the high voltage generator 600 has a connector 601 for connecting with the relay board 400, and a switch section 602 that performs a switching operation based on an instruction from the relay board 400. According to the switching operation by the switch section 602, a transformer section 603 transforms and outputs the electric power. The output electric power is smoothed into a predetermined polarity and converted into a direct current voltage in a smoothing section 604. The direct current voltage is output via an output terminal 607. The value of the voltage converted into the direct current in the smoothing section 604 is detected by the voltage detecting section 606, and the detected voltage value is transmitted to the relay board 400 via the connector 601. The current value of the output voltage is also detected by a current detecting section 605, and the detected current value is transmitted to the relay board 400 via the connector 601. The high voltage generator 600 is grounded via a grounding terminal 608.

Figure 15:
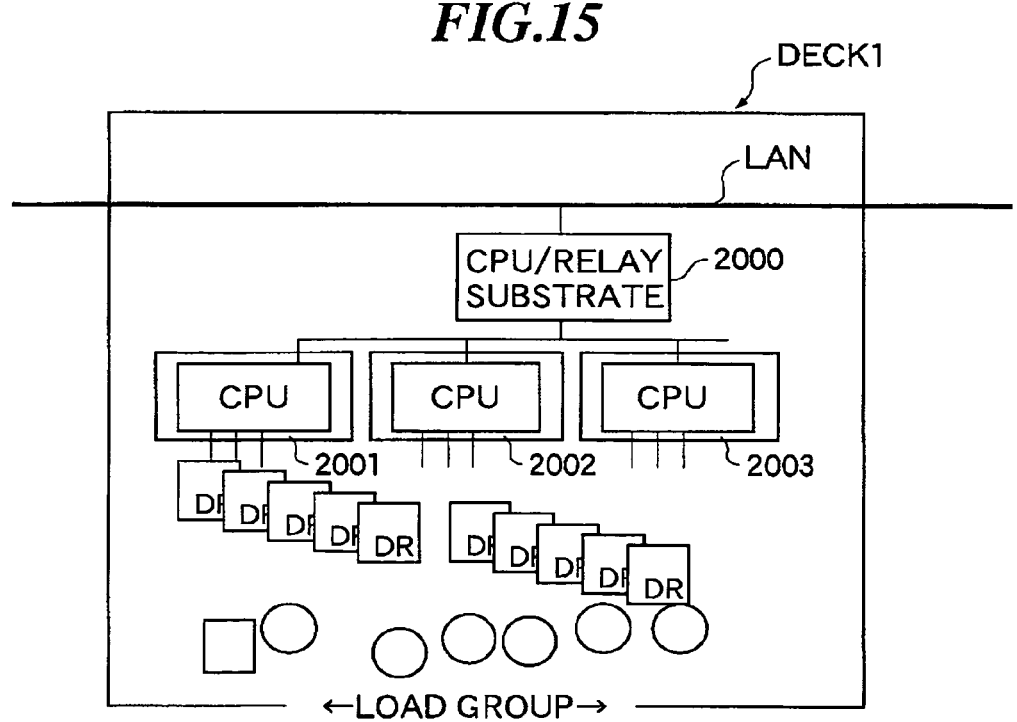
FIG. 15 is a diagram schematically showing an example of connection between the image forming apparatus and a paper feed deck.
Figure 16:
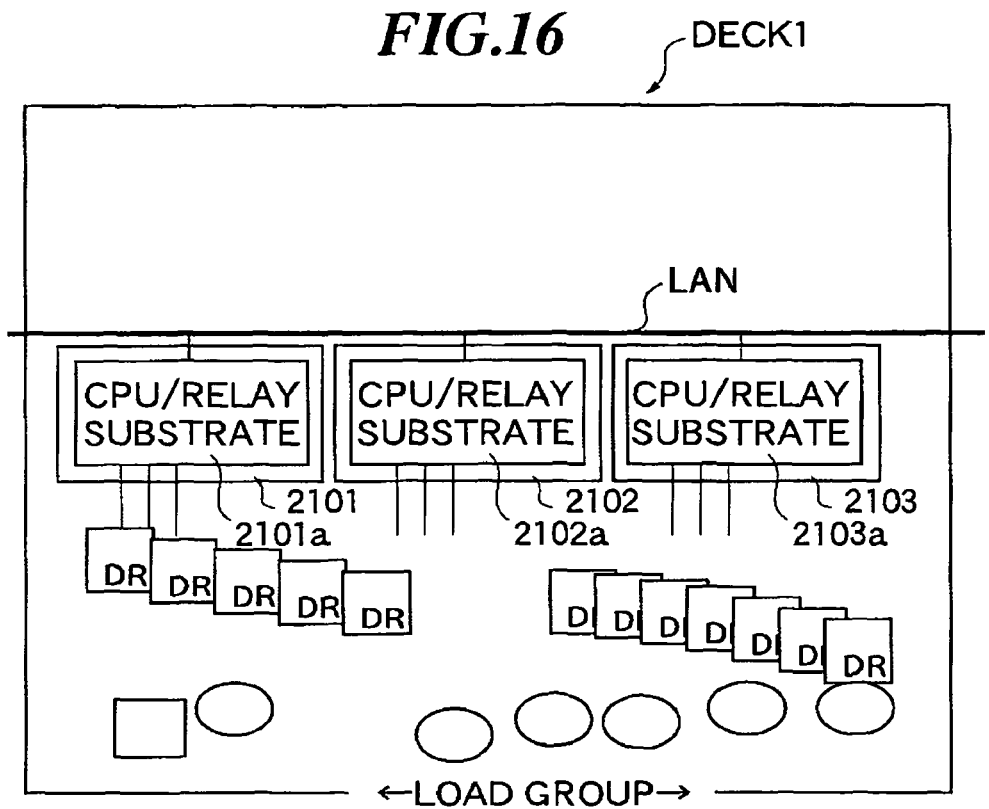
FIG. 16 is a diagram schematically showing another example of connection between the image forming apparatus and the paper feed deck.
Figure 17:
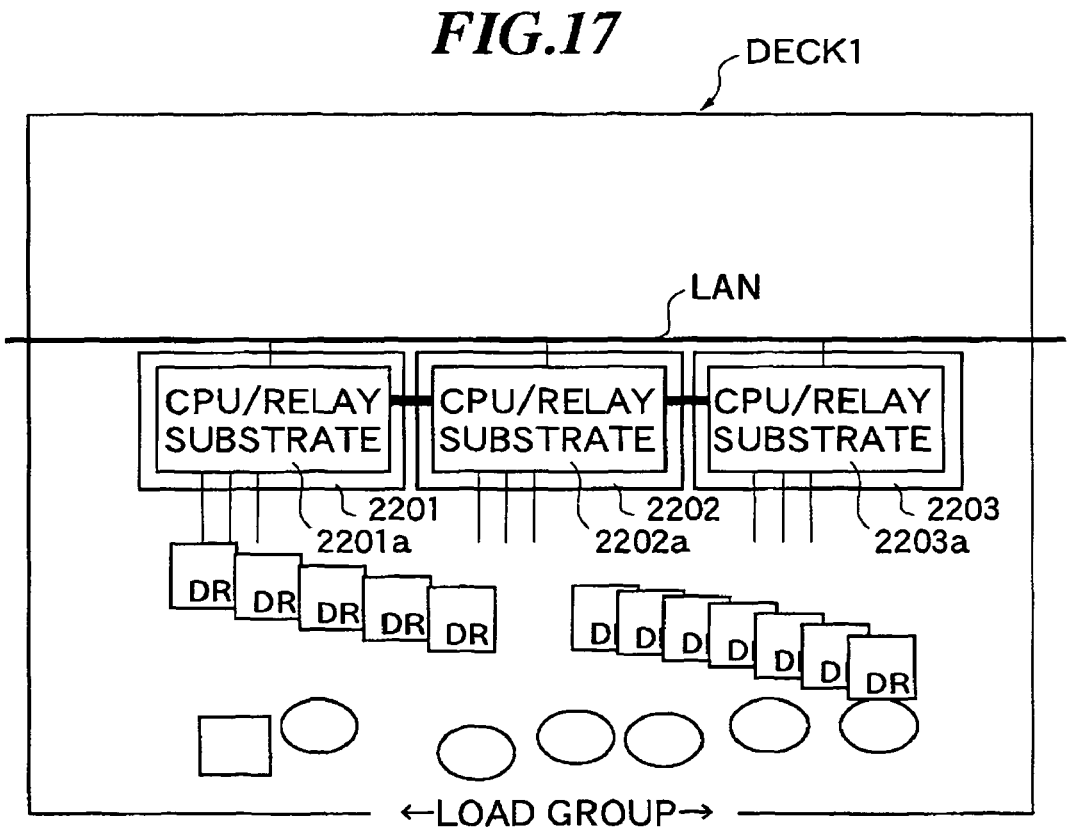
FIG. 17 is a diagram schematically showing still another example of connection between the image forming apparatus and the paper feed deck.

Now, connection between the image forming apparatus 700 and the paper feed deck DECK 1 will be described with reference to FIGS. 15 to 17. FIG. 15 is a diagram schematically showing an example of connection between the image forming apparatus 700 and the paper feed deck DECK 1. FIG. 16 is a diagram schematically showing another example of connection between the image forming apparatus 700 and the paper feed deck DECK 1. FIG. 17 is a diagram schematically showing still another example of connection between the image forming apparatus 700 and the paper feed deck DECK 1. Although not described, the paper feed deck DECK 2 and the finisher FIN in FIG. 8 are also connected with the communication IC 105 via a LAN in a manner similar to the paper feed deck DECK 1 described below.

In FIG. 15, the paper feed deck DECK 1 is connected via a LAN with the communication IC 105 on the CPU board 100 residing in the image forming apparatus 700 in FIG. 8. As shown in FIG. 15, the paper feed deck DECK 1 has a managing CPU/relay substrate 2000 connected to the LAN, and paper feed units 2001-2003. Each of the paper feed units 2001-2003 is provided with a CPU. The managing CPU/relay substrate 2000 is communicatively connected with the CPUs of the paper feed units 2001-2003. In this case, the CPU board 100 only needs to communicate with the managing CPU/relay substrate 2000 of the paper feed deck DECK 1, which reduces the load on the paper feed deck DECK 1 imposed by the CPU board 100.

Alternatively, the paper feed deck DECK 1 may have the configuration shown in FIG. 16. In this case, the paper feed deck DECK 1 has paper feed units 2101, 2102, 2103, which have CPU/relay substrates 2101a, 2102a, 2103a connected to the LAN respectively. In this configuration, the CPU board 100 will directly communicate with each of the CPU/relay substrates 2101a, 2102a, 2103a corresponding to the paper feed units 2101, 2102, 2103 in the paper feed deck DECK 1.

Alternatively, the paper feed deck DECK 1 may have the configuration shown in FIG. 17. In this case, the paper feed deck DECK 1 has paper feed units 2201, 2202, 2203. The paper feed units 2201, 2202, 2203 are provided with CPU/relay substrates 2201a, 2202a, 2203a connected to the LAN respectively. The CPU/relay substrates 2201a, 2201b, 2201c are serially connected toward the downstream side so that the CPU/relay substrate 2201a is the top and the CPU/relay substrate 2201c is the bottom.

Further, it is to be understood that the object of the present invention may also be accomplished by supplying a system or an apparatus with a storage medium in which a program code of software, which realizes the functions of the above described embodiments are stored, and causing a computer (or CPU or MPU) of the system or apparatus to read out and execute the program code stored in the storage medium.

The above program has only to realize the functions of the above described embodiments on a computer, and the form of the program may be an object code, a program code executed by an interpreter, or script data supplied to an OS.

In this case, the program code itself read from the storage medium realizes the functions of the above described embodiments, and therefore the program code and a storage medium in which the program code is stored constitute the present invention.

Examples of the storage medium for supplying the program code include a floppy (registered trademark) disk, a hard disk, a magnetic-optical disk, an optical disk such as a CD-ROM, a CD-R, a CD-RW, a DVD-ROM, a DVD-RAM, a DVD-RW, and a DVD+RW, a magnetic tape, a nonvolatile memory card, and a ROM. Alternatively, the program may be downloaded via a network from another computer, a database, or the like, not shown, connected to the Internet, a commercial network, a local area network, or the like.

Further, it is to be understood that the functions of the above described embodiment may be accomplished not only by executing the program code read out by a computer, but also by causing an OS (operating system) or the like which operates on the computer to perform a part or all of the actual operations based on instructions of the program code.

Further, it is to be understood that the functions of the above described embodiment may be accomplished by writing a program code read out from the storage medium into a memory provided on an expansion board inserted into a computer or a memory provided in an expansion unit connected to the computer and then causing a CPU or the like provided in the expansion board or the expansion unit to perform a part or all of the actual operations based on instructions of the program code.

This application claims the benefit of Japanese Application No. 2005-150921, filed May 24, 2005, which is hereby incorporated by reference herein in its entirety.

What is claimed is:

1. An image reading apparatus comprising:
    a reading unit that illuminates an original;
    a driving unit that drives said reading unit and moves said reading unit along the original;
    a document feeding apparatus that feeds a document so that the document passes through a reading position where documents are read while being conveyed;
    a first control unit that controls said document feeding apparatus;
    a second control unit that is separate from said first control unit; and
    an interface unit that connects said first control unit and said second control unit,
    wherein:
    said first control unit informs, via said interface unit, said second control unit of identification information for identifying a type of said first control unit previously provided to said first control unit,
    said second control unit generates a driving profile for said driving unit corresponding to the identification information informed by said first control unit, and
    said driving unit drives said reading unit according to the generated driving profile.

2. An image reading apparatus according to claim 1, wherein said second control unit has a storage unit that stores data for generating the driving profile for said driving unit in association with the identification information, and said second control unit obtains data associated with the identification information from the stored data and generates the driving profile for said driving unit based on the obtained data.

3. An image reading apparatus according to claim 2, wherein said first control unit has a data rewriting unit that rewrites data stored in said storage unit via said interface unit.

4. An image reading apparatus according to claim 2, wherein said storage unit is replaceable.

5. An image reading apparatus according to claim 2, further comprising:
    a fixing unit that fixes a document,
    wherein said storage unit stores data for defining at least an acceleration in an acceleration interval, a deceleration in a deceleration interval, and the speed in the constant-speed interval for said reading unit to read an image on the fixed document.

6. An image reading apparatus according to claim 1, wherein said driving unit has a driving motor for driving said reading unit and a driving circuit, for driving said driving motor under the control of said second control unit, included in said first control unit, and said second control unit outputs a control signal according to the generated driving profile to said driving circuit via said interface unit.

7. An image reading apparatus according to claim 1, wherein said second control unit has a reinformation requesting unit that sends a reinformation request for asking said first control unit to reinform the identification information if the identification information informed by said first control unit cannot be recognized, and in the case where the reinformation request is received, said first control unit reinforms the identification information recognizable by said second control unit in response to the reinformation request.

8. An image forming apparatus comprising said image reading apparatus according to claim 1.

9. An image reading control method for an image reading apparatus comprising a reading unit that illuminates an original; a driving unit that drives said reading unit and moves said reading unit along the original; a document feeding apparatus that feeds a document so that the document passes through a reading position where documents are read while being conveyed; a first control unit that controls said document feeding apparatus; a second control unit that is separate from said first control unit; and an interface unit that connects said first control unit and said second control unit, wherein said image reading control method comprises:

an informing step of informing, with said first control unit via said interface unit, said second control unit of identification information for identifying a type of said first control unit previously provided to said first control unit; and a driving profile generating step of generating, with said second control unit, a driving profile for said driving unit corresponding to the identification information informed in said informing step; and a driving step of driving, with said driving unit, said reading unit according to the driving profile generated in said driving profile generating step.

10. A non-transitory computer-readable storage medium storing a program for causing a computer to execute an image reading control method for an image reading apparatus comprising a reading unit that illuminates an original; a driving unit that drives said reading unit and moves said reading unit along the original; a document feeding apparatus that feeds a document so that the document passes through a reading position where documents are read while being conveyed; a first control unit that controls said document feeding apparatus; a second control unit that is separate from said first control unit; and an interface unit that connects said first control unit and said second control unit, wherein said program comprises:

an informing module for informing said second control unit of identification information for identifying a type of said first control unit previously provided to said first control unit; and a driving profile generating module for generating a driving profile for said driving unit corresponding to the identification information informed by said informing module; and a driving module for driving said reading unit according to the driving profile generated by said driving profile generating module.

* * * * *